US010187191B2

(12) United States Patent
Chen et al.

(10) Patent No.: US 10,187,191 B2
(45) Date of Patent: Jan. 22, 2019

(54) SRS TRANSMISSION IN MANAGEMENT IN CARRIER AGGREGATION

(71) Applicant: QUALCOMM Incorporated, San Diego, CA (US)

(72) Inventors: Wanshi Chen, San Diego, CA (US); Peter Gaal, San Diego, CA (US); Tien Chien Chen, HsinChin (TW); Rebecca Wen-Ling Yuan, San Diego, CA (US); Hongbo Yan, Vista, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 15/414,250

(22) Filed: Jan. 24, 2017

(65) Prior Publication Data
US 2017/0215198 A1 Jul. 27, 2017

Related U.S. Application Data

(60) Provisional application No. 62/287,870, filed on Jan. 27, 2016.

(51) Int. Cl.
*H04L 5/00* (2006.01)
*H04W 72/12* (2009.01)
(Continued)

(52) U.S. Cl.
CPC .............. *H04L 5/0073* (2013.01); *H04L 5/001* (2013.01); *H04L 5/005* (2013.01); *H04L 5/0051* (2013.01);
(Continued)

(58) Field of Classification Search
CPC ............. H04W 72/1205; H04L 5/0051; H04L 5/0219; H04L 5/0073; H04L 5/001; H04L 5/0055; H04L 5/005
See application file for complete search history.

(56) References Cited

U.S. PATENT DOCUMENTS

2013/0195084 A1* 8/2013 Chen ................. H04W 72/0413
370/336
2014/0105130 A1 4/2014 Noh et al.
(Continued)

OTHER PUBLICATIONS

ISA/EP, International Search Report and Written Opinion of the International Searching Authority, Int'l Application No. PCT/US2017/014856, dated Apr. 7, 2017, European Patent Office, Rijswijk, NL, 16 pgs.

*Primary Examiner* — Gary Mui

(57) ABSTRACT

Systems, methods, and apparatuses for sounding reference signal (SRS) management in carrier aggregation (CA) are described. A user equipment (UE) may be scheduled for overlapping (e.g., concurrent) transmissions of SRS and uplink control or data on different cells of a CA configuration. In some cases, the SRS transmission may be dropped (e.g., the UE may refrain from transmitting a scheduled SRS). While in some cases, the UE may transmit both SRS and another uplink message in overlapping time intervals on different cells (e.g., SRS may be transmitted concurrently with another uplink message). A determination of whether to transmit or drop SRS may be based on whether the different cells have different cyclic prefix (CP) lengths or on whether the SRS is scheduled to be transmitted in a special subframe of a time division duplexing (TDD) configuration, for example.

26 Claims, 16 Drawing Sheets

(51) Int. Cl.
*H04W 52/02* (2009.01)
*H04L 5/14* (2006.01)
*H04L 27/26* (2006.01)

(52) U.S. Cl.
CPC ....... *H04L 5/0055* (2013.01); *H04W 52/0219* (2013.01); *H04W 72/1205* (2013.01); *H04L 5/0098* (2013.01); *H04L 5/1469* (2013.01); *H04L 27/2607* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(56) References Cited

U.S. PATENT DOCUMENTS

| | | |
|---|---|---|
| 2014/0119302 A1 | 5/2014 | Ahn et al. |
| 2015/0036601 A1 | 2/2015 | Kim et al. |
| 2015/0139162 A1 | 5/2015 | Dinan |
| 2015/0365218 A1 | 12/2015 | Yang et al. |
| 2016/0278030 A1* | 9/2016 | Yi ........................ H04W 16/32 |
| 2016/0295575 A1* | 10/2016 | Dinan ................... H04L 5/0048 |
| 2017/0164299 A1* | 6/2017 | Shimezawa ........... H04W 52/16 |
| 2017/0272299 A1* | 9/2017 | Chae ................... H04L 27/2662 |
| 2017/0374679 A1* | 12/2017 | Park ...................... H04W 74/04 |

\* cited by examiner

SRS TRANSMISSION IN MANAGEMENT IN CARRIER AGGREGATION

CROSS REFERENCES

The present Application for Patent claims priority to U.S. Provisional Patent Application No. 62/287,870 by Chen, et al., entitled "SRS TRANSMISSION MANAGEMENT IN CARRIER AGGREGATION," filed Jan. 27, 2016, assigned to the assignee hereof.

BACKGROUND

The following relates generally to wireless communication and more specifically to SRS transmission management in carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

A UE may transmit uplink control information, and the UE may also transmit sounding reference signals (SRS) to facilitate error correction and data transmission. SRS dropping procedures may be used when an uplink control or data transmission is scheduled in a time period that overlaps with an SRS. The decision of whether to drop SRS may be made without regard to a UE's capability or availability of resources, which may cause inconsistent transmission of SRS and result in a decreased in system performance.

SUMMARY

Systems, methods, and apparatuses are described for sounding reference signal (SRS) management in carrier aggregation (CA). A user equipment (UE) may be scheduled for overlapping (e.g., concurrent) transmissions of SRS and uplink control or data on different cells of a CA configuration. The UE may determine whether to transmit SRS in these circumstances based on whether the different cells of the CA configuration have different cyclic prefix (CP) lengths or whether the SRS is scheduled to be transmitted in a special subframe of a time division duplexing (TDD) configuration. For example, in these cases, SRS may be transmitted as long as the UE is not power limited.

In some examples, wireless devices may be scheduled to transmit a message on one component carrier (CC) and a SRS on another CC. A transmitting device determines whether the CC on which SRS is scheduled for transmission has a special subframe. The transmitting device may also attempt to determine if the message on the other CC overlaps in time with the SRS that is scheduled to transmit during the special subframe. The transmitting device may transmit the message, the SRS, or both, based at least in part on these determinations.

A method of wireless communication is described. The method may include determining whether a first cyclic prefix (CP) for the first component carrier (CC) has a different duration than a second CP for the second CC, determining that a message scheduled for transmission on the first CC overlaps in time with a sounding reference signal (SRS) scheduled for transmission on the second CC and transmitting the message or the SRS, or both, based at least in part on the determination that the message overlaps in time with the SRS and the determination whether the first CP has the different duration than the second CP.

An apparatus for wireless communication is described. The apparatus may include means for determining whether a first CP for the first CC has a different duration than a second CP for the second CC, means for determining that a message scheduled for transmission on the first CC overlaps in time with a SRS scheduled for transmission on the second CC and means for transmitting the message or the SRS, or both, based at least in part on the determination that the message overlaps in time with the SRS and the determination whether the first CP has the different duration than the second CP.

A further apparatus is described. The apparatus may include a processor, memory in electronic communication with the processor, and instructions stored in the memory. The instructions may be operable, when executed by the processor, to cause the apparatus to determine whether a first CP for the first CC has a different duration than a second CP for the second CC, determine that a message scheduled for transmission on the first CC overlaps in time with a SRS scheduled for transmission on the second CC and transmit the message or the SRS, or both, based at least in part on the determination that the message overlaps in time with the SRS and the determination whether the first CP has the different duration than the second CP.

A non-transitory computer readable medium for wireless communication is described. The non-transitory computer-readable medium may include instructions to cause a processor to determine whether a first CP for the first CC has a different duration than a second CP for the second CC, determine that a message scheduled for transmission on the first CC overlaps in time with a SRS scheduled for transmission on the second CC and transmit the message or the SRS, or both, based on the determination that the message overlaps in time with the SRS and the determination whether the first CP has the different duration than the second CP.

In some examples of the method, apparatus, or non-transitory computer-readable medium described herein, the first CC and the second CC comprise component carriers (CCs) of a same timing adjustment group (TAG). Some examples include determining that the first CP for the first CC has a different duration than the second CP for the second CC, and the transmitting comprises: transmitting the message on the first CC and transmitting the SRS on the second CC.

Some examples of the method, apparatus, or non-transitory computer-readable medium described herein include determining that the first CP for the first CC has a same duration as the second CP for the second CC, and refraining from transmitting the SRS based on the determination that the message overlaps in time with the SRS and the determination that the first CP has the same duration than the second CP, and the transmitting comprises: transmitting the message on the first CC.

Some examples of the method, apparatus, or non-transitory computer-readable medium described herein may further include processes, features, means, or instructions for identifying a power limitation of a UE, and transmitting the message or the SRS, or both, based on the power limitation.

In some examples of the method, apparatus, or non-transitory computer-readable medium described herein, the message comprises a physical uplink shared channel (PUSCH) message or a physical uplink control channel (PUCCH) message. In some examples of the method, apparatus, or non-transitory computer-readable medium described above, the message comprises acknowledgement/negative acknowledgment (ACK/NACK) feedback.

Some examples of the method, apparatus, or non-transitory computer-readable medium described herein may further include processes, features, means, or instructions for identifying a duplexing configuration for the first CC or the second CC, where the transmitting is based on the duplexing configuration.

Another method of wireless communication is described. The method may include determining that the second CC comprises a special subframe that comprises a plurality of uplink (UL) symbols and a plurality of downlink (DL) symbols, determining that a message scheduled for transmission on the first CC overlaps in time with a SRS scheduled for transmission on the second CC during the special subframe and transmitting the message or the SRS, or both, based at least in part on the determination that the message overlaps in time with the SRS and the determination that the second CC comprises the special subframe.

Another apparatus for wireless communication is described. The apparatus may include means for determining that the second CC comprises a special subframe that comprises a plurality of UL symbols and a plurality of DL symbols, means for determining that a message scheduled for transmission on the first CC overlaps in time with a SRS scheduled for transmission on the second CC during the special subframe and means for transmitting the message or the SRS, or both, based at least in part on the determination that the message overlaps in time with the SRS and the determination that the second CC comprises the special subframe.

A further apparatus is described. The apparatus may include a processor, memory in electronic communication with the processor, and instructions stored in the memory. The instructions may be operable, when executed by the processor, to cause the apparatus to determine that the second CC comprises a special subframe that comprises a plurality of UL symbols and a plurality of DL symbols, determine that a message scheduled for transmission on the first CC overlaps in time with a SRS scheduled for transmission on the second CC during the special subframe and transmit the message or the SRS, or both, based at least in part on the determination that the message overlaps in time with the SRS and the determination that the second CC comprises the special subframe.

Another non-transitory computer readable medium for wireless communication is described. The non-transitory computer-readable medium may include instructions to cause a processor to determine that the second CC comprises a special subframe that comprises a set of UL symbols and a set of DL symbols, determine that a message scheduled for transmission on the first CC overlaps in time with a SRS scheduled for transmission on the second CC during the special subframe and transmit the message or the SRS, or both, based on the determination that the message overlaps in time with the SRS and the determination that the second CC comprises the special subframe.

In some examples of the method, apparatus, or non-transitory computer-readable medium described herein, the special subframe comprises a UL pilot time slot (UpPTS) configuration that comprises at least six UL symbols. In some examples of the method, apparatus, or non-transitory computer-readable medium described herein, the transmitting comprises: transmitting the message on the first CC and transmitting the SRS on the second CC.

In some examples of the method, apparatus, or non-transitory computer-readable medium described herein, refraining from transmitting the SRS based on the determination that the message overlaps in time with the SRS and the determination that the second CC comprises the special subframe, and where the transmitting comprises: transmitting the message on the first CC.

Some examples of the method, apparatus, or non-transitory computer-readable medium described herein may further include processes, features, means, or instructions for identifying a power limitation for a UE, and transmitting the message or the SRS, or both, based on the power limitation.

In some examples of the method, apparatus, or non-transitory computer-readable medium described herein, the message comprises a PUSCH message or a PUCCH message. In some examples of the method, apparatus, or non-transitory computer-readable medium described above, the message comprises ACK/NACK feedback.

Some examples of the method, apparatus, or non-transitory computer-readable medium described herein may further include processes, features, means, or instructions for identifying a duplexing configuration for the first CC or the second CC, where performing the transmitting is based on the duplexing configuration.

DETAILED DESCRIPTION

Sounding reference signals (SRS) may be used to improve channel estimation for uplink transmissions. In some wireless communications systems, an SRS transmission may be dropped when it collides with other uplink transmissions. That is, in some cases, when an SRS is scheduled to be transmitted on one cell of a carrier aggregation (CA) configuration and an uplink message (e.g., a control or data channel) is scheduled to be transmitted on another cell of the CA configuration, and the respective transmissions are scheduled to overlap in time (e.g., they are scheduled for concurrent transmission), then a UE may determine whether it will transmit both SRS and the other message. The UE may make the determination based on a number of factors, including capabilities of the user equipment (UE) and the configuration of the communication system.

A determination to refrain from transmitting SRS may be referred to as "SRS dropping." For example, a decision about SRS dropping may depend on whether a UE is configured with one or multiple timing adjustment groups (TAGs), on the duplexing configuration of component carriers (CCs) in a carrier aggregation (CA) scheme, on a specific SRS dropping setting, or on the content of the scheduled message that collides with the SRS. SRS dropping may also be determined based on the cyclic prefix (CP) length used by different cells in a CA configuration. For example, an SRS dropping rule may be based on that scheduling overlap between SRS and other uplink transmissions which may result from different cells having different CP configurations (and hence, different symbol periods). As one example, when different cells have different CP configurations SRS may be transmitted as long as the UE is not power limited (e.g., the UE has sufficient power capabilities and may operate according to system constraints if it transmits both SRS and an uplink message).

Different SRS dropping rules may also apply when collisions include SRS scheduled in UpPTS symbols of special subframes. Time division duplexing (TDD) cells may employ special subframes to transition from downlink to uplink transmissions. In some cases, a special subframe may include up to six (or more) symbol periods for SRS transmission. Whether or not SRS is transmitted in these symbol periods may be based on rules based specifically on the scheduling of (or type of) a special subframe.

Aspects of the disclosure are described above are discussed below in the context of a wireless communication system. Additional examples of the disclosure relate to CP configurations in CA and SRS transmission management in different CA configurations. Aspects of the disclosure are further illustrated by and described with reference to apparatus diagrams, system diagrams, and flowcharts that relate to SRS transmission management in carrier aggregation.

Figure 1:
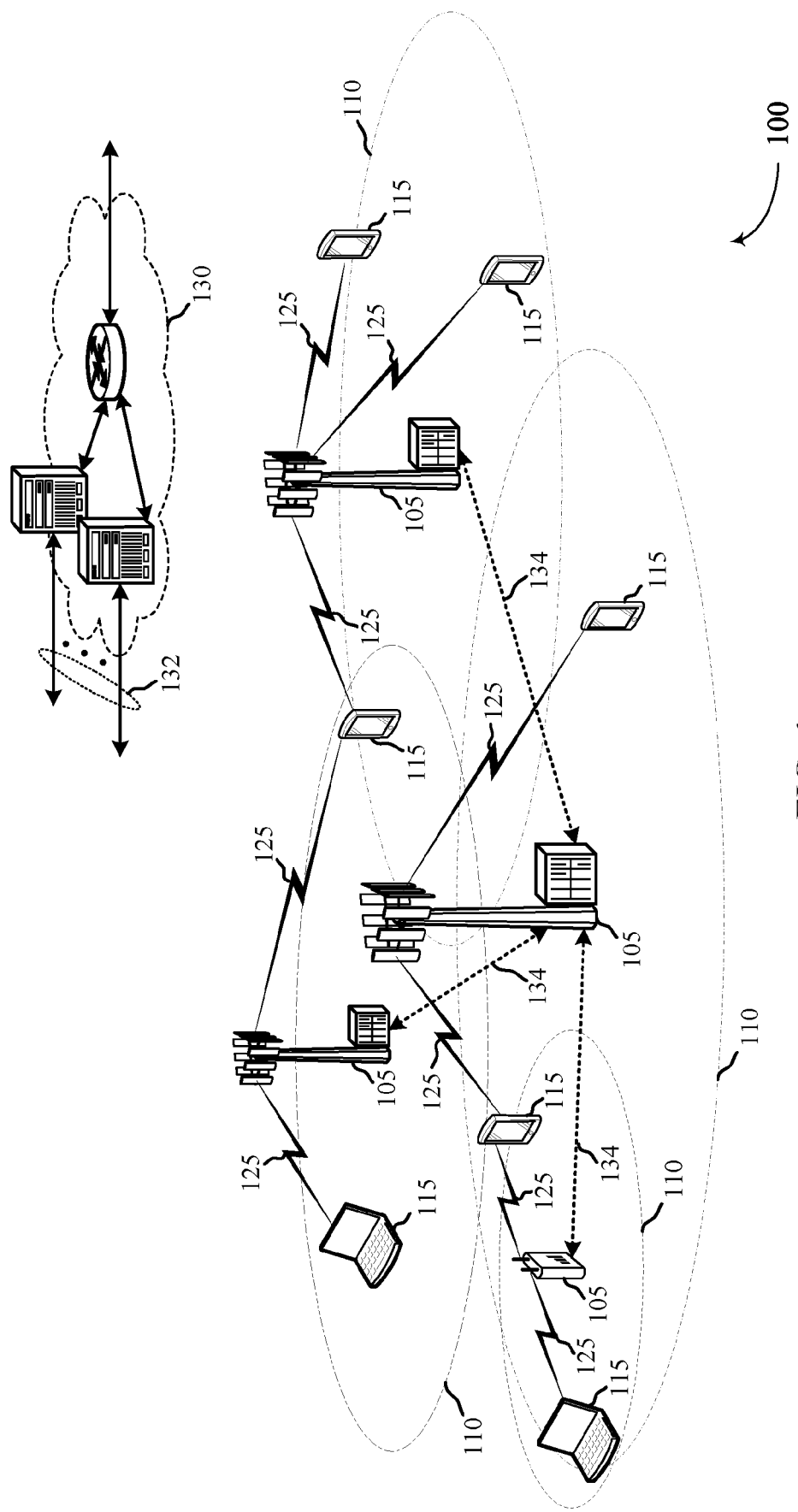
FIG. 1 illustrates an example of a wireless communications system that supports SRS transmission management in carrier aggregation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In some examples, wireless communications system 100 may support SRS dropping rules based on cyclic prefix (CP) type or a component carrier (CC) scheduling a SRS transmission on a special subframe.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a base station 105 and a UE 115 may communicate using more than one carrier. Each aggregated carrier is referred to as a CC. Each component can have a bandwidth of, e.g., 1.4, 3, 5, 10, 15, or 20 MHz. In some cases, the number of CCs can be limited to, e.g., a maximum of five giving maximum aggregated bandwidth is 100 MHz. In frequency division duplexing (FDD), the number of aggregated carriers can be different in DL and UL. The number of UL CCs may be equal to or lower than the number of DL CCs. The individual CCs can also be of different bandwidths. For time division duplex (TDD) the number of CCs as well as the bandwidths of each CC will normally be the same for DL and UL. Component carriers may be arranged in a number of ways. For example, a carrier aggregation (CA) configuration may be based on contiguous CCs within the same operating frequency band, i.e., called intra-band contiguous CA. Non-contiguous allocations can also be used, where the CCs may be either be intra-band, or inter-band.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. In some cases, the cells serving a UE 115 may be divided into multiple TAGs. Each TAG may be associated with a different timing offset, such that the UE 115 may synchronize UL transmissions differently for different UL carriers of a same base station or different base stations.

Sounding reference signals (SRS) may be transmitted by UE 115 using a predetermined sequence (e.g., a Zadoff-Chu sequence) so that a base station 105 may estimate the UL channel quality. An SRS transmission may or may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 115. In some cases, SRS transmission on one cell may interfere with transmission of other uplink data on another cell. In these cases, SRS dropping rules may determine whether the SRS is transmitted.

For example, in some cases SRS may be dropped to accommodate transmission of a physical uplink control channel (PUCCH). PUCCH may be used for UL acknowledgements (ACKs), scheduling requests (SRs), channel quality indicator (CQI), and other UL control information. A PUCCH may be mapped to a control channel defined by a code and two consecutive resource blocks (RBs). UL control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

In some cases, SRS transmission may depend on cyclic prefix (CP) length. A CP may be used to correct reception issues that arise from different path lengths between a transmitter and a receiver. The different path lengths may arise from signal reflections between the transmitter and receiver. A set of different paths may generate a multi-path delay spread, which may be mitigated by using a guard period at the beginning of each symbol. The guard period may be known as a CP and may be greater than the multi-path delay spread. A wireless network may specify a normal and an extended CP length.

A frame structure may be used to organize physical (PHY) resources in wireless communications system 100. A frame may be a 10 ms interval that may be further divided into 10 equally sized sub-frames. Each sub-frame may include two consecutive time slots. Each slot may include 6 or 7 OFDMA symbol periods based on the CP length. Thus, when different CP lengths are used by different cells, the symbol periods of the different cells may not be aligned. A resource element (RE) consists of one symbol period and one subcarrier (a 15 KHz frequency range). A resource block (RB) may contain 12 consecutive subcarriers in the frequency domain and, for a normal CP in each OFDM symbol, 7 consecutive OFDM symbols in the time domain (1 slot), or 84 REs. Some REs may include DL reference signals (DL-RS).

SRS transmission may also depend on the duplexing configuration of different cells. That is, UEs 115 within wireless communications system 100 may communicate using FDD or TDD. Different frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically or dynamically.

Special subframes in TDD may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame.

That is, TDD cells may employ special subframes to transition from a downlink to an uplink transmission. Special subframes may include a Downlink Pilot Time Slot (DwPTS) and an Uplink Pilot Time Slot (UpPTS), separated by a guard period. A UpPTS may facilitate uplink synchronization with a base station. If the SRS is scheduled on any symbol in UpPTS, the SRS may be dropped under the first cell if either PUCCH or PUSCH is scheduled.

Thus, use of TDD may enable flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. Specific SRS dropping rules may be defined for CA configurations employing special subframes.

In some cases, wireless communications system 100 may utilize one or more enhanced component carrier (eCC). An eCC may be characterized by one or more features including: flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic TDD operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

As discussed herein, a UE 115 may be scheduled for overlapping transmissions of SRS, uplink control, and uplink data on different cells of a CA configuration. In some cases, the SRS transmission may be dropped. SRS dropping may be based on whether the different cells have different CP lengths, or on whether the SRS is scheduled to be transmitted in a special subframe of a TDD configuration. For example, in these cases SRS may be transmitted as long as the UE 115 s not power limited.

Figure 2:
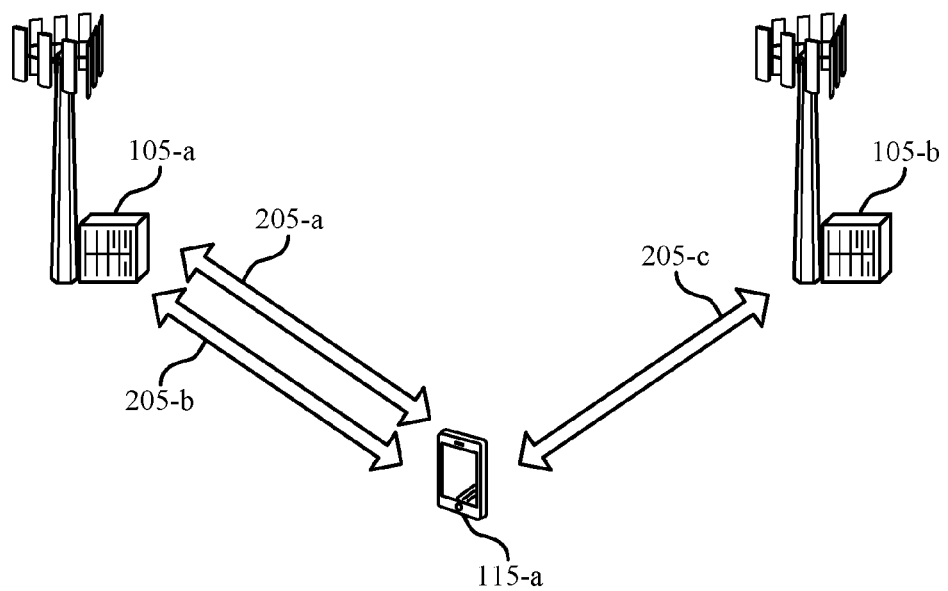
FIG. 2 illustrates an example of a wireless communications system that supports SRS transmission management in carrier aggregation in accordance with aspects of the present disclosure.

FIG. 2 illustrates an example of a wireless communications system 200 for SRS transmission management in carrier aggregation. Wireless communications system 200 may include base stations 105-*a* and 105-*b* and UE 115-*a*, which may be examples of the corresponding devices described with reference to FIG. 1. The base stations 105 and UE 115-*a* may communicate using component carriers (CCs) 205-*a*, 205-*b*, and 205-*c* according to a CA configuration. In some examples, wireless communications system 100 may support SRS dropping based on CP type or subframe configuration.

An SRS transmission may be dropped based on a number of factors including capabilities of the UE 115 and the configuration of the communication system. For example, an SRS dropping rule may depend on whether a UE 115 is configured with one or multiple timing adjustment groups (TAGs). As another example, a UE 115 not configured with multiple TAGs may not transmit SRS in a symbol in which SRS and physical uplink shared channel (PUSCH) transmissions overlap.

Regardless of whether the UE 115 is configured with multiple TAGs, SRS and PUCCH may coincide in the same subframe in the same serving cell (e.g., CC 205-*a*) or in different cells. In some cases, the UE 115 may not transmit SRS whenever SRS transmissions and PUCCH transmissions that carry hybrid automatic repeat request-acknowledgement (HARQ-ACK) and/or positive scheduling requests (SR) happen to coincide in the same subframe if a subframe parameter (e.g., an ACK/NACK-SRS simultaneous transmission indication) is false.

SRS dropping rules may depend on the duplexing configuration of CCs in a CA scheme. In frequency division duplexing (FDD), uplink and downlink messages may be separated by frequency, while in time division duplexing (TDD) uplink and downlink messages may be separated in time. FDD-TDD CA may include a first cell (e.g., a primary cell, such as CC 205-*a*, that includes PUCCH/PUSCH scheduled transmission) and a second cell (e.g., a secondary cell such as CC 205-*b* or 205-*c*, with SRS scheduled transmission) that employ different types of duplexing. (PUSCH may also be transmitted on secondary cells CC 205-*b* or 205-*c*.) SRS transmission may also depend on a configurable simultaneous transmission parameter. For example, in some cases UE 115-*a* may transmit SRS in a symbol when SRS transmission and PUCCH overlap in the same symbol and the parameter (e.g., ACK/NACK-SRS simultaneous transmission indication) is true.

CC 205-*a*, CC 205-*b*, and CC 205-*c* may not be configured with the same CP length. For example, wireless communications system 200 may specify a normal and an extended CP length. A CP may be used to correct reception issues that arise from different path lengths between a transmitter and a receiver. The different path lengths may arise from signal reflections between the transmitter and receiver. A set of different paths may generate a multi-path delay spread, which may be mitigated by using a guard period at the beginning of each symbol. This guard period may be known as a CP and may be selected so that it is greater than the multi-path delay spread.

SRS dropping in wireless communications system 200 may be determined based on the CP used by the different CCs. For example, an SRS dropping rule may depend on whether there is scheduling overlap as a result of CC 205-*a* and CC 205-*b* having different CP lengths. For example, in cells with different CP lengths, SRS may be dropped when SRS collides with PUCCH or PUSCH and UE 115-*a* is power limited.

SRS scheduled in the last symbol of a subframe may not overlap with PUCCH/PUSCH when the cell with SRS is configured with a normal CP. That is, either both cells may have a normal CP, or the cell with extended CP carries the PUCCH/PUSCH. For example, PUSCH/PUCCH may not be scheduled in the last extended CP symbol, so that there is no overlap with SRS scheduled in the shorter last normal CP symbol.

In another example, one cell may have a normal CP and employ TDD CA, and the other cell may have an extended CP and employ FDD CA. In such cases, there is no overlap between the last symbol of the FDD (extended CP) cell and the second to last symbol of the TDD (normal CP) cell and therefore, there may be no overlap between PUCCH/PUSCH scheduling on the FDD cell and the SRS in the last symbol of the TDD cell.

However, collisions may occur when the SRS is transmitted on any symbol of the subframe other than the last symbol of an uplink pilot time slot (UpPTS) associated with a special subframe of the TDD cell. The terms "collision" and "collide," as used herein," may refer to scheduled transmissions that would occur during a common time. Such transmissions may be concurrent, contemporaneous, or simultaneous—e.g., as described herein, the transmission may be scheduled to have some overlap in time but may or may not occur at precisely the same time or have the same duration. For example, if SRS is scheduled in the last two symbols of the second cell, the SRS scheduled in the second to last symbol may overlap with PUCCH/PUSCH and the SRS scheduled in the last symbol may not overlap.

When the cell with SRS is configured with an extended CP, the overlapping channel (e.g., PUSCH or PUCCH) may determine whether or not the SRS transmission is dropped. For instance, a TDD cell may be configured with an extended CP, and an FDD cell may be configured with a normal CP. In such cases, there may be an overlap between the last symbol of the extended CP cell and a portion of the second to last symbol of the normal CP.

Different SRS dropping rules may also apply when collisions include SRS scheduled in UpPTS symbols of special subframes. For example, if SRS is transmitted in a special subframe (or a certain type of special subframe such as one including a certain number of uplink symbols or scheduled with a given number of SRS symbols), SRS may be dropped when SRS collides with PUCCH or PUSCH and UE 115-*a* is power limited.

Figure 3A:
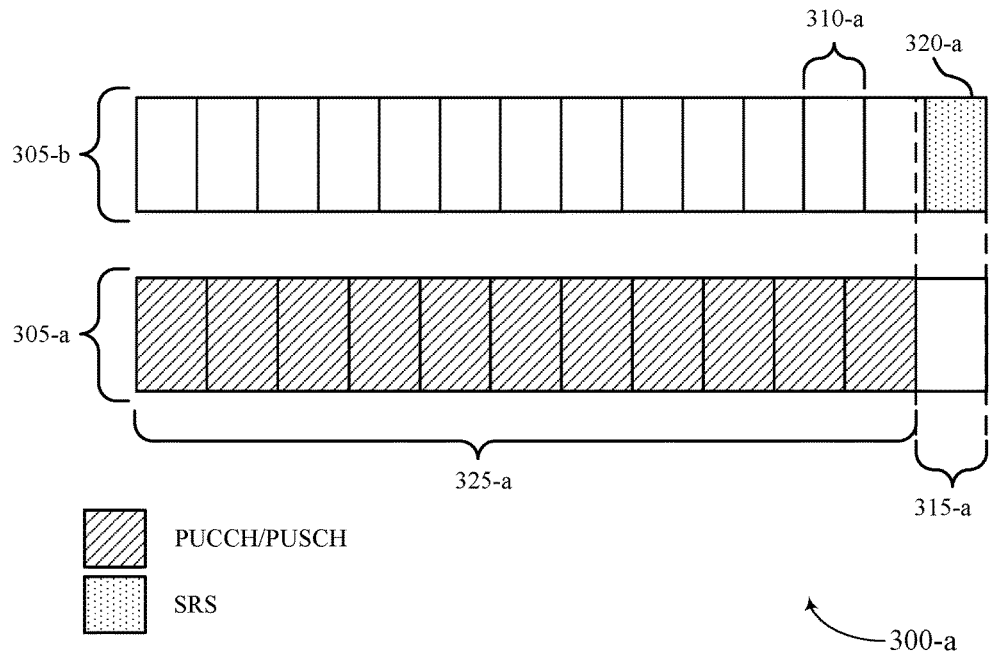
FIGS. 3A through 4B and FIG. 5 illustrate examples of cell configurations that support SRS transmission management in carrier aggregation in accordance with aspects of the present disclosure.
Figure 3B:
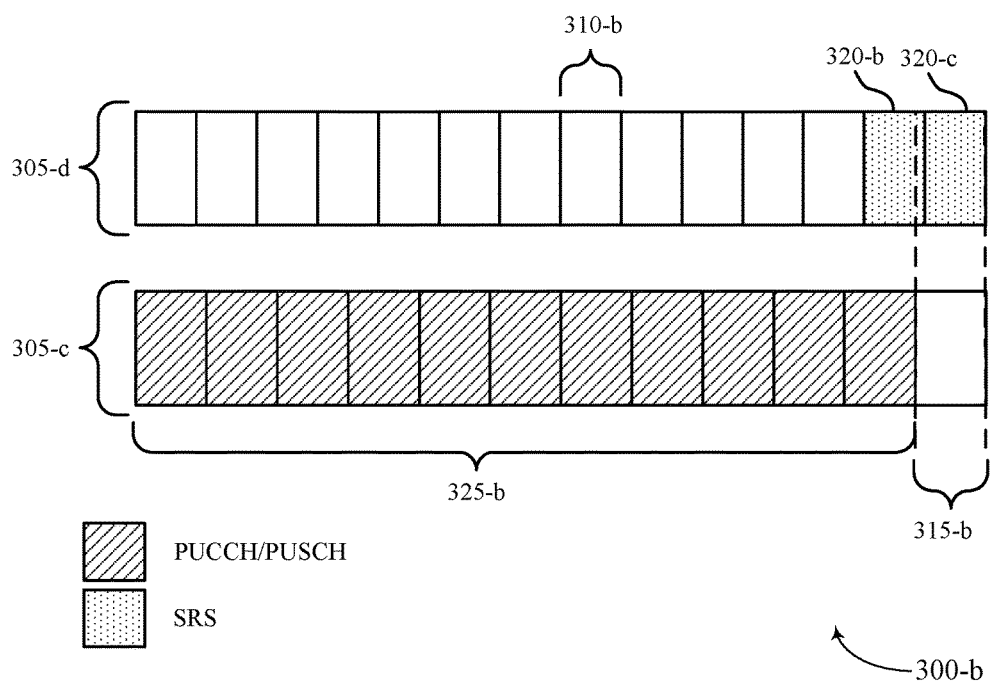

FIGS. 3A and 3B illustrate examples of component carrier or cell configurations 300-*a* and 300-*b* for SRS transmission management in carrier aggregation. Cell configurations 300-*a* and 300-*b* may represent examples of component carrier configurations for SRS transmission performed by a UE 115 or base station 105 as described with reference to FIGS. 1-2. Cell configurations 300-*a* and 300-*b* represent examples in which a first cell 305-*a* scheduled for PUCCH or PUSCH has a longer CP than a second cell 305-*b* that is scheduled for one or more SRS 320.

An SRS dropping rule may be determined based on the type of CA duplexing and CP used by a first cell 305-*a* (e.g., a primary cell with PUCCH/PUSCH scheduling) and a second cell 305-*b* (e.g., a secondary cell with SRS scheduling). A first cell 310-*a* may be configured with an extended CP and extended symbol periods 315 with a symbol length longer than a normal symbol period 310. A second cell 305-a may be configured with a normal CP and utilize normal symbol periods 310. The difference in symbol length may result in a last extended symbol overlap region where the last and a portion of the second to last normal symbol periods 310 of the second cell 305-b subframe overlap with the last extended symbol period 315 of the first cell 305-a subframe. SRS 320 may be scheduled on normal symbol periods 310 of second cell 305 and PUCCH/PUSCH message 325 may be scheduled on extended symbol periods 315 of first cell 305. PUCCH/PUSCH message 325 may not be scheduled on the last extended symbol period 315.

FIG. 3A shows SRS 320-a transmitted in an uplink subframe. The SRS 320-a scheduled in the last normal symbol period 310-a of the subframe may have no overlap with PUCCH/PUSCH message 325-a scheduled in the last extended symbol period 315-a, since no PUCCH/PUSCH message 325-a may be scheduled in the extended symbol period 315-a at the end of the subframe. The SRS 320-a of the last normal symbol period 310 may not be dropped as there is no overlapping with PUCCH/PUSCH scheduling 325-a of first cell 305-a.

In other examples, including FIG. 3B, SRS 320-b may be transmitted in UpPTS symbols associated with a special subframe. The second cell 305-c may be configured with TDD CA and the first cell 305-a may be configured with FDD CA. The SRS 320-c scheduled in the last normal symbol period 310-c of the subframe may have no overlap with PUCCH/PUSCH message 325-b since no PUCCH/PUSCH message 325-b may be scheduled in the extended symbol period 315-b at the end of the subframe. Therefore, the SRS 320-c may not be dropped due to collisions. However, SRS 320-b may also be scheduled in the second to last normal symbol period 310-b. An overlapped SRS portion may overlap with the PUCCH/PUSCH message 325-b scheduled in the second to last extended symbol period 315-b of the subframe. In this case, the SRS 320-b scheduled in the second to last normal symbol period 310-b may be dropped (e.g., due to overlapped SRS portion), while the SRS 320-c scheduled in the last normal symbol period 310-b may not be dropped.

Figure 4A:
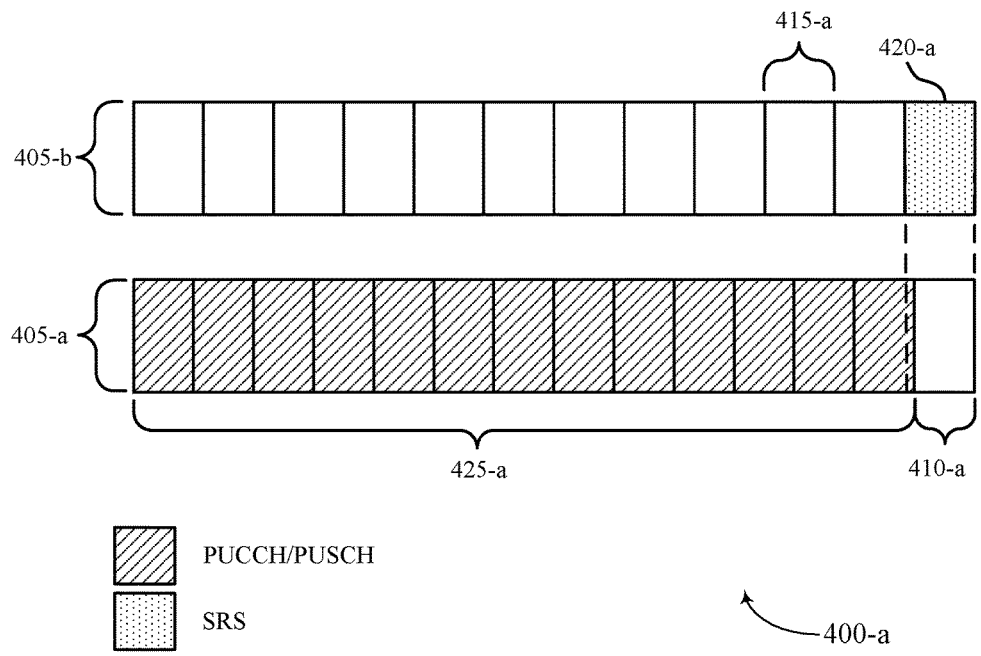
Figure 4B:
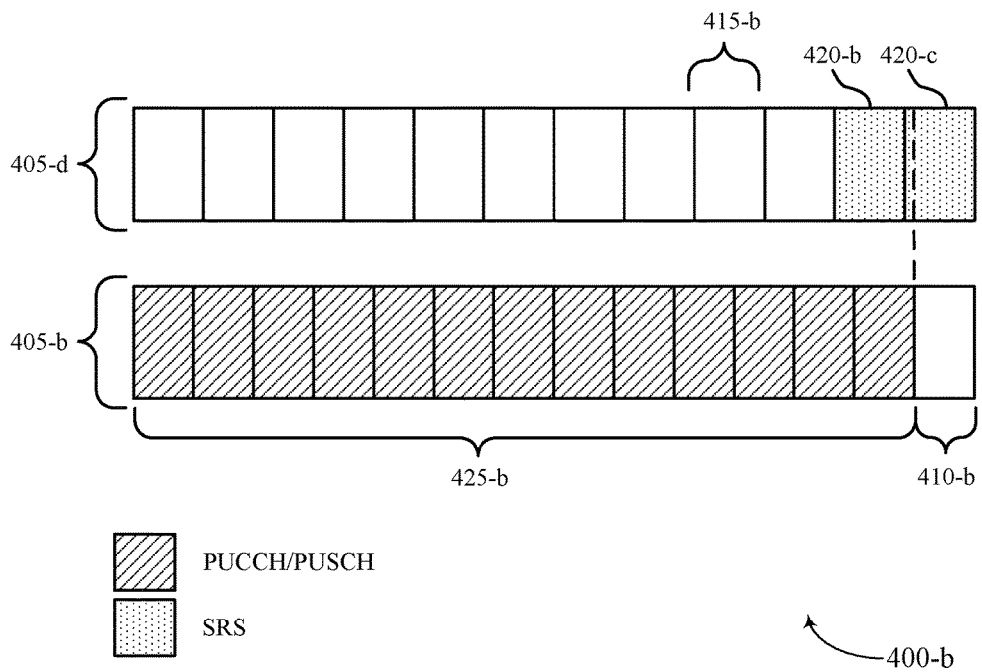

FIGS. 4A and 4B illustrate examples of a component carrier or cell configurations 400-a and 400-b for SRS transmission management in carrier aggregation. In some cases, component carrier configuration 400-a and 400-b may represent aspects of techniques performed by a UE 115 or base station 105 as described with reference to FIGS. 1-2. In some cases, component carrier configuration 400-a and 400-b may represent examples of component carrier configurations for SRS transmission performed by a UE 115 or base station 105 as described with reference to FIGS. 1-2.

SRS dropping may be determined based on the type of CA duplexing and CP used by a first cell 405-a (e.g., a primary cell with PUCCH/PUSCH message) and a second cell 405-b (e.g., a secondary cell with SRS scheduling). A first cell 405-a may be configured with a normal CP and utilize normal symbol periods 410 with a symbol length shorter than an extended symbol period 415. A second cell 405-b may be configured with an extended CP and extended symbol periods 415. The difference in symbol length may result in a last extended symbol overlap region where the last and a portion of the second to last normal symbol periods 410 of the first cell 405-a subframe overlap with the last extended symbol period 415 of the second cell 405-b subframe. SRS 420 may be scheduled on extended symbol periods 415 of second cell 405-b and PUCCH/PUSCH message 425 may be scheduled on normal symbol periods 410 of first cell 405. PUCCH/PUSCH message 425 may not be scheduled in the last normal symbol period 410.

FIG. 4A shows SRS 420-a transmitted in an uplink subframe. The SRS 420-a scheduled in the last extended symbol period 415-a of the subframe overlaps with the last and a portion of the second to last normal symbol periods 410-a in the last extended symbol overlap region. As PUCCH/PUSCH message 425-a may be scheduled in the second to last normal symbol period 410 of first cell 405-a, the SRS 420-a and PUCCH/PUSCH message 425-a may overlap. If the PUCCH/PUSCH message 425-a consists of PUCCH message, the SRS 420-a may not be dropped. However, if the PUCCH/PUSCH message 425-a consists of PUSCH message, the SRS 420-a may be dropped.

In other examples, including as depicted in FIG. 4B, SRS 420-b and 420-c may be transmitted in UpPTS symbols associated with a special subframe. The second cell 405-c may be configured with TDD CA and the first cell 405-d may be configured with FDD CA. The SRS 420-c scheduled in the last extended symbol period 415-b of the subframe may overlap with the last and a portion of the second to last normal symbol periods 410-b in the last extended symbol overlap region. An overlapped SRS portion may overlap with the PUCCH/PUSCH message 425-a scheduled in the second to last normal symbol period of the subframe. The overlapped SRS portion includes SRS 420-b scheduled in the second to last extended symbol period and a portion of the SRS 420-c scheduled in the last extended symbol period. In this case, the SRS 420-c scheduled in the last extended symbol period and in the second to last extended symbol period may be dropped (e.g., due to overlapped SRS portion 430).

Figure 5:
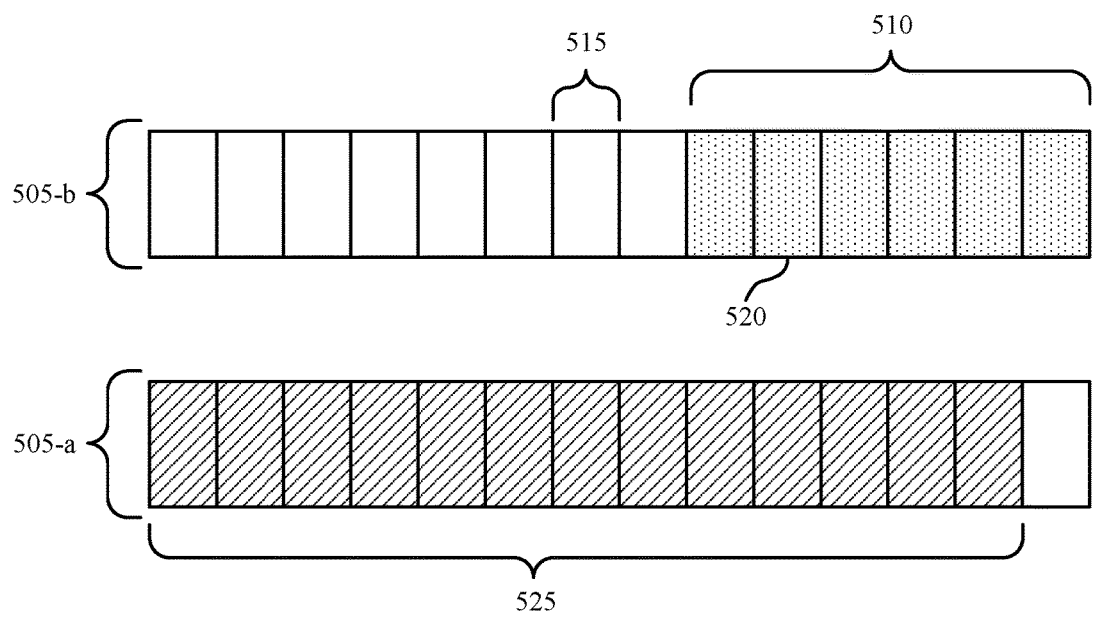
Figure 5:
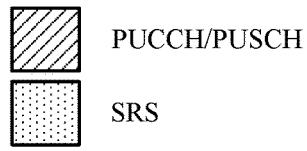

FIG. 5. illustrates an example of a component carrier or cell configuration 500 for SRS transmission management in carrier aggregation. In some cases, configuration 500 may represent aspects of techniques performed by a UE 115 or base station 105 as described with reference to FIGS. 1-2. In some cases, configuration 500 may represent examples of component carrier configurations for SRS transmission used by a UE 115 or base station 105 as described with reference to FIGS. 1-2.

In cell configuration 500, a first cell 505-a (e.g., a primary cell with PUCCH/PUSCH scheduling) and second cell 505-b (e.g., a secondary cell with SRS scheduling) may be configured with a normal CP and utilize normal symbol periods 515. The second cell may be configured with TDD CA and utilize a special subframe that includes a UpPTS region 510. In this case, the UpPTS may include a number of normal symbol periods 515 (e.g., 6 symbols). The second cell 505-b may transmit SRS 520 even when overlapping with PUCCH/PUSCH message 525, as long as the UE is not power limited. The SRS 520 may not be dropped when there is overlap with first cell 505-a PUCCH/PUSCH message 525 whether the UE is configured with one or multiple TAGs, or whether there is TDD CA, FDD CA, or TDD-FDD CA. The second cell 505-b may not drop SRS 520 transmissions in symbols prior to the last symbol in the subframe. For example, SRS 520 may fill all symbols (e.g., 6 symbols) of a UpPTS region 510 and may not drop the transmissions even when there is overlap with first cell 505-a PUCCH/PUSCH message 525.

Figure 6:
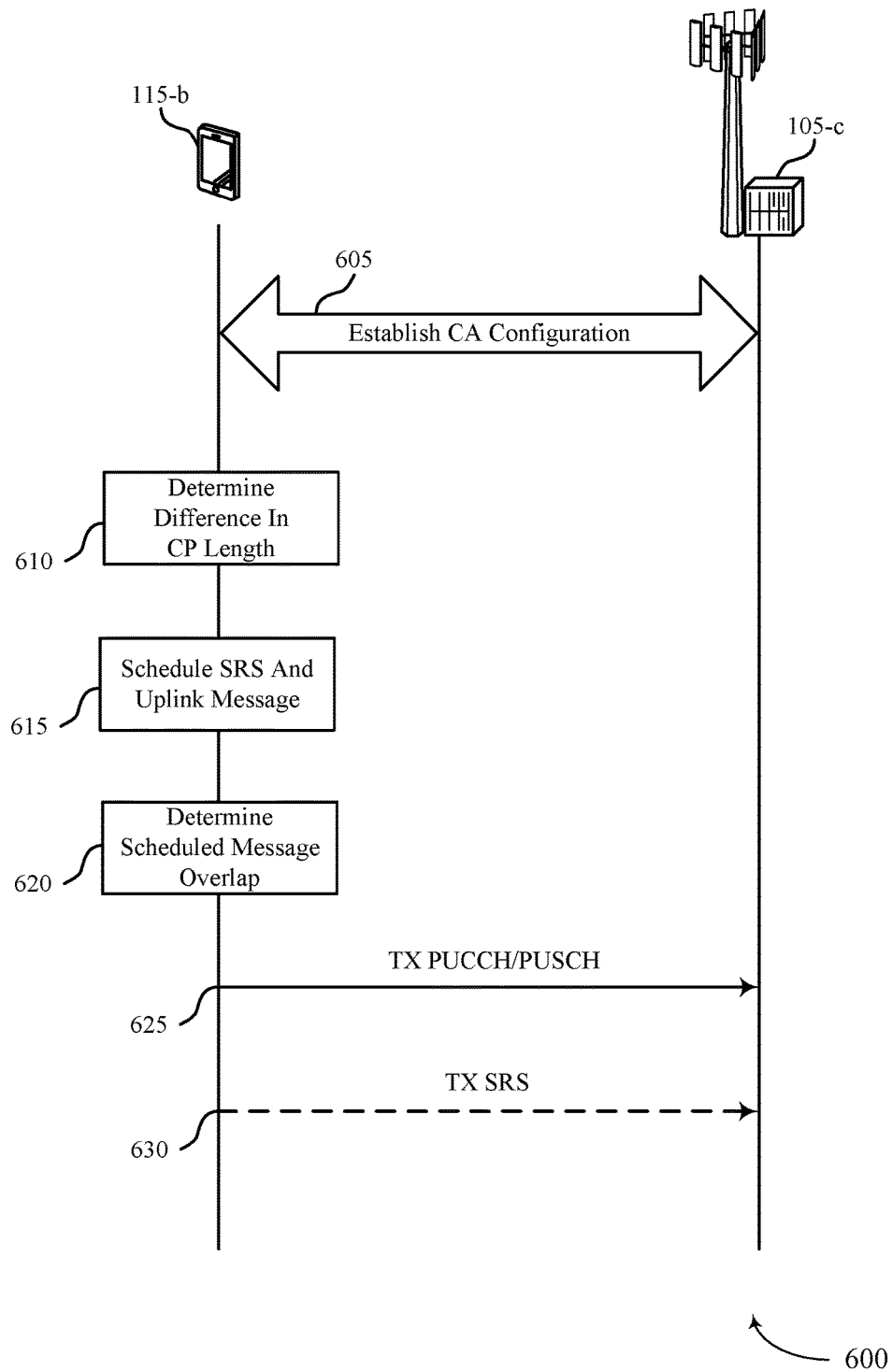
FIGS. 6 and 7 illustrate examples of process flows in a system that supports SRS transmission management in carrier aggregation in accordance with aspects of the present disclosure.

FIG. 6 illustrates an example of a process flow 600 for SRS transmission management in carrier aggregation. In some cases, process flow 600 may represent aspects of techniques performed by a UE 115 or base station 105 as described with reference to FIGS. 1-2. In some cases, process flow 600 may represent examples of component carrier configurations for SRS transmission performed by a UE 115 or base station 105 as described with reference to FIGS. 1-2.

At step 605, UE 115-*b* and base station 105-*c* may establish a CA configuration. At step 610, UE 115-*b* may determine a difference in CP length between the first and second cells. In some cases the cells may have the same CP and have no difference in CP length. In other cases, a first CP for the first cell may have a different duration than a second CP for the second cell. The first cell and the second cell may be cells of a same timing adjustment group (TAG).

At step 615, UE 115-*b* may schedule SRS and a message for uplink transmission. For example, the first cell may schedule SRS and the second cell may schedule PUCCH/PUSCH.

At step 620, UE 115-*b* may determine that a message scheduled for transmission on the first cell overlaps in time with an SRS scheduled for transmission on the second cell. The message may be a PUCCH message or a PUSCH message and may further contain ACK/NACK feedback.

At step 625, UE 115-*b* may transmit the uplink message. The message may be transmitted on the first cell.

At step 630, UE 115-*b* may transmit the SRS based on the determination that the message overlaps in time with the SRS and on the determination that the first cell's CP has a different duration than the second cell's CP. The SRS may be transmitted on the second cell. UE 115-*c* may be power limited and, in that case, may not transmit the SRS. In some examples, the SRS may also be transmitted based on a duplexing configuration of the first and second cells, as described above.

Figure 7:
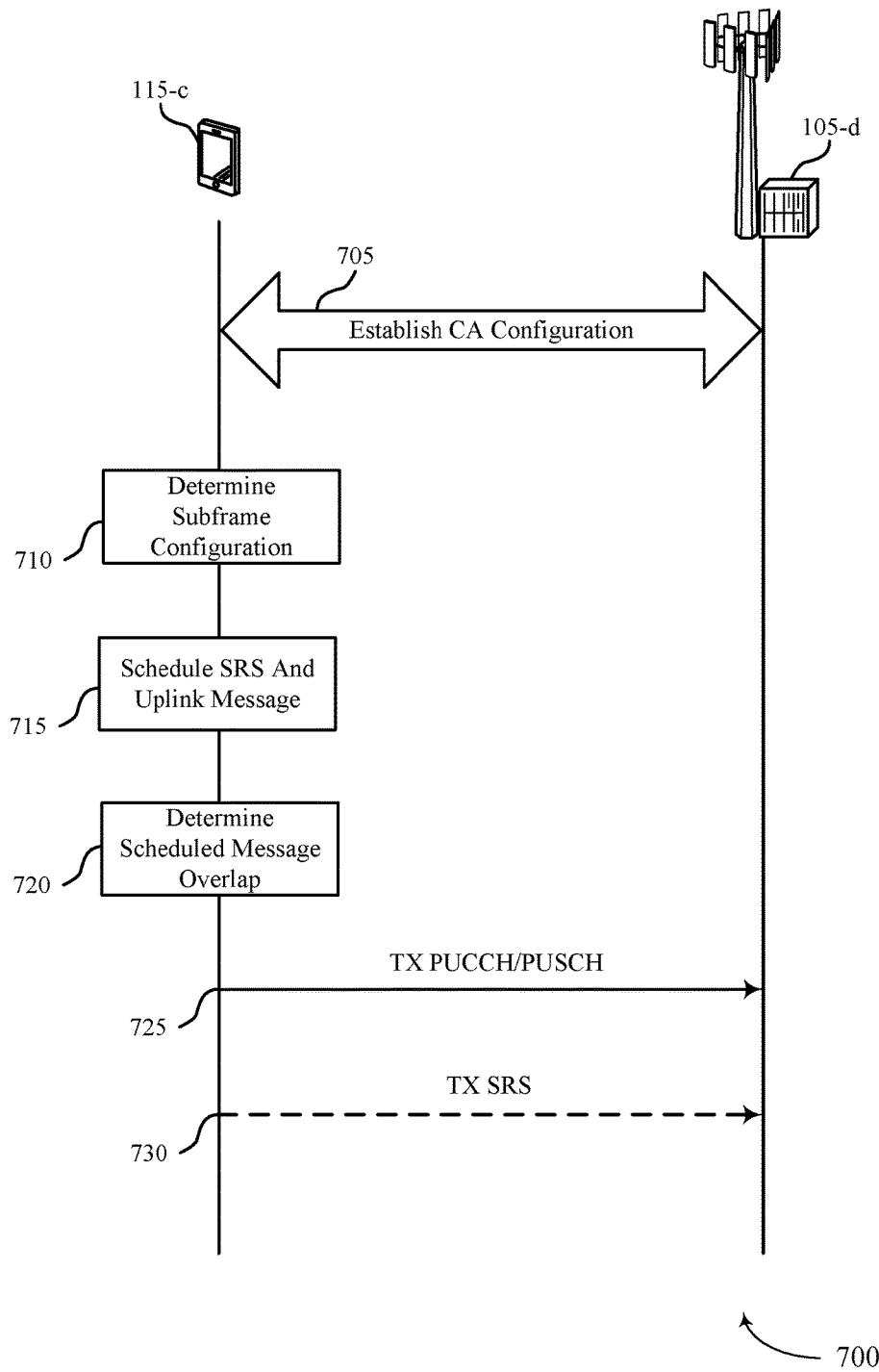

FIG. 7 illustrates an example of a process flow 700 for SRS transmission management in carrier aggregation in accordance with various aspects of the present disclosure. Process flow 700 may include base station 105-*a* and UE 115-*a*, which may be examples of the corresponding devices described with reference to FIG. 1-2.

At step 705, UE 115-*c* and base station 105-*d* may establish a CA configuration. At step 710, UE 115-*c* may determine a subframe configuration of a second cell. In some cases, the second cell may utilize a special subframe with both uplink and downlink symbols.

At step 715, UE 115-*c* may schedule SRS and a message for uplink transmission. For example, the first cell may schedule SRS and the second cell may schedule PUCCH/PUSCH.

At step 720, UE 115-*c* may determine that a message scheduled for transmission on the first cell overlaps in time with an SRS scheduled for transmission on the second cell during the special subframe. The message may be a PUCCH message or a PUSCH message and may further contain ACK/NACK feedback.

At step 725, UE 115-*c* may transmit the uplink message. The message may be transmitted on the first cell.

At step 730, UE 115-*c* may transmit the SRS based on the determination that the message overlaps in time with the SRS and on the determination that the second cell comprises the special subframe. The SRS may be transmitted on the second cell. UE 115-*c* may be power limited and, in that case, may not transmit the SRS. In some examples, the SRS may also be transmitted based on a duplexing configuration of the first and second cells.

Figure 8:
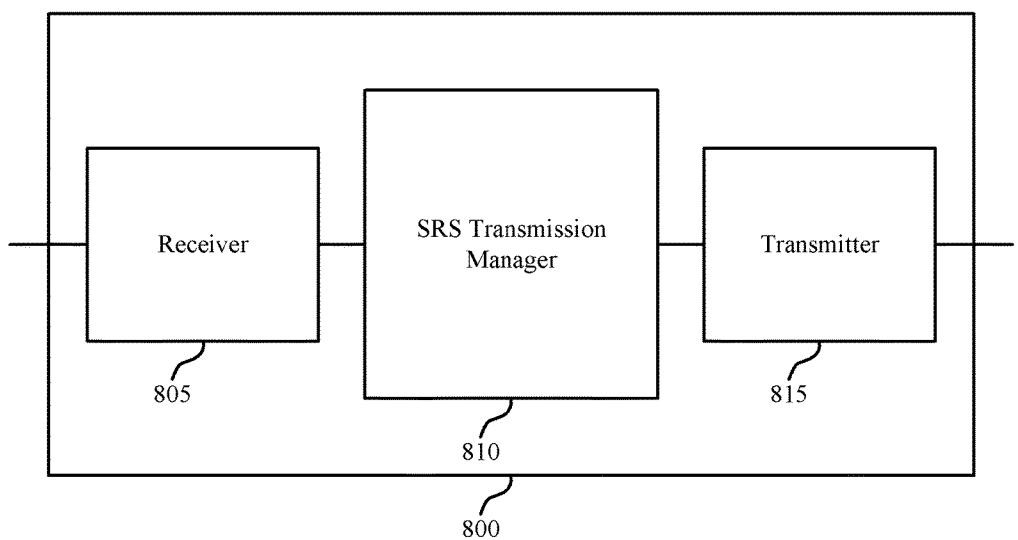
FIGS. 8 through 10 show block diagrams of a wireless device that supports SRS transmission management in carrier aggregation in accordance with aspects of the present disclosure.

FIG. 8 shows a block diagram of a wireless device 800 that supports SRS transmission management in carrier aggregation in accordance with various aspects of the present disclosure. Wireless device 800 may be an example of aspects of a UE 115 described with reference to FIGS. 1 and 2. Wireless device 800 may include receiver 805, SRS transmission manager 810, and transmitter 815. Wireless device 800 may also include a processor. Each of these components may be in communication with each other.

The receiver 805 may receive information such as packets, user data, or control information associated with various information channels (e.g., control channels, data channels, and information related to SRS transmission management in carrier aggregation, etc.). Information may be passed on to other components of the device. The receiver 805 may be an example of aspects of the transceiver 1125 described with reference to FIG. 11.

The SRS transmission manager 810 may determine that a second CC comprises a special subframe that includes a set of UL symbols and a set of DL symbols, determine that a message scheduled for transmission on the first CC overlaps in time with a SRS scheduled for transmission on the second CC during the special subframe, transmit the message or the SRS, or both, based on the determination that the message overlaps in time with the SRS and the determination that the second CC comprises the special subframe.

The SRS transmission manager 810 may also determine whether a first CP for the first CC has a different duration than a second CP for the second CC, determine that a message scheduled for transmission on the first CC overlaps in time with a SRS scheduled for transmission on the second CC, and transmit the message or the SRS, or both, based on the determination whether the message overlaps in time with the SRS and the determination that the first CP has the different duration than the second CP. The SRS transmission manager 810 may also be an example of aspects of the SRS transmission manager 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas.

Figure 9:
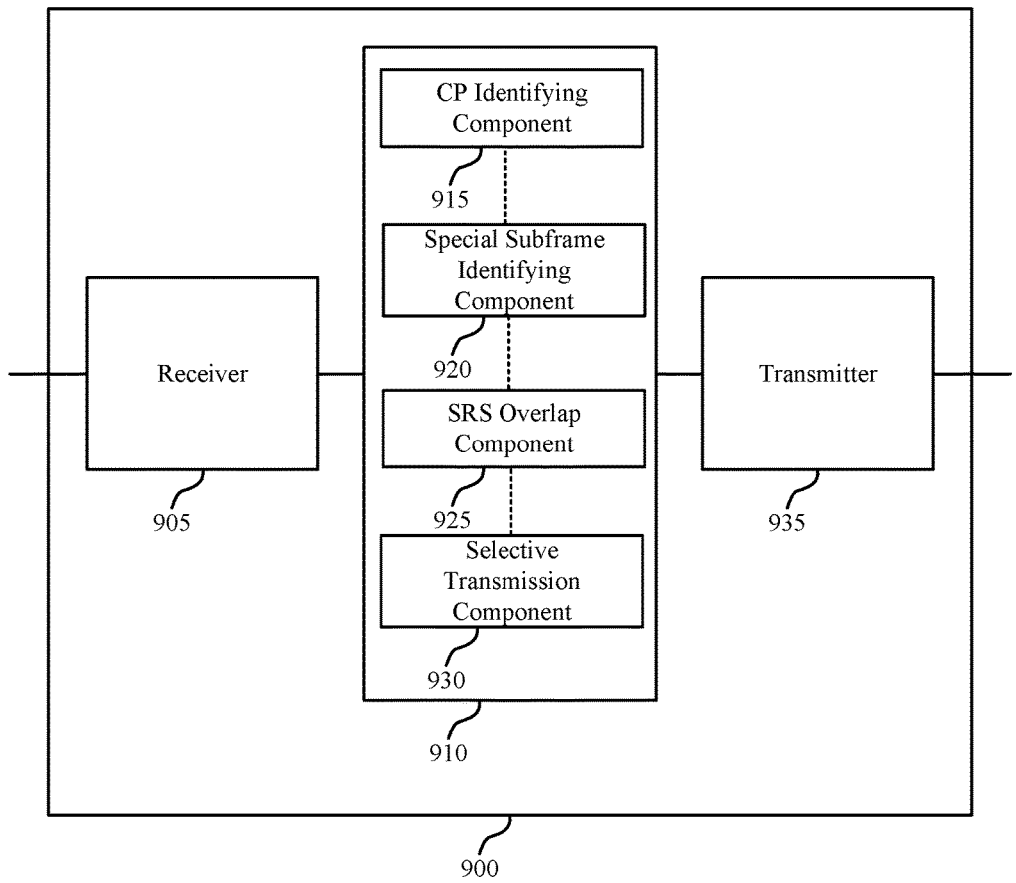

FIG. 9 shows a block diagram of a wireless device 900 that supports SRS transmission management in carrier aggregation in accordance with various aspects of the present disclosure. Wireless device 900 may be an example of aspects of a wireless device 800 or a UE 115 described with reference to FIGS. 1, 2 and 8. Wireless device 900 may include receiver 905, SRS transmission manager 910, and transmitter 935. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The SRS transmission manager 910 may be an example of aspects of receiver 805 described with reference to FIG. 8. The SRS transmission manager 910 may include CP identifying component 915, special subframe identifying component 920, SRS overlap component 925 and selective transmission component 930. The SRS transmission manager 910 may be an example of aspects of the SRS transmission manager 1105 described with reference to FIG. 11.

The CP identifying component 95 may determine whether a first CP for the first CC has a different duration than a second CP for the second CC. In some cases, the first CC and the second CC comprise CCs of a same TAG.

The special subframe identifying component 920 may determine that the second CC comprises a special subframe that includes a set of UL symbols and a set of DL symbols. In some cases, the special subframe comprises a UL pilot time slot (UpPTS) configuration that comprises at least six UL symbols.

The SRS overlap component 925 may determine that a message scheduled for transmission on the first CC overlaps in time with a SRS scheduled for transmission on the second CC during the special subframe, and determine that a message scheduled for transmission on the first CC overlaps in time with a SRS scheduled for transmission on the second CC. In some cases, the message comprises a PUSCH message or a PUCCH message. In some cases, the message comprises acknowledgement/negative acknowledgment (ACK/NACK) feedback.

The selective transmission component 930 may transmit the message or the SRS, or both, based on the determination whether the message overlaps in time with the SRS and the determination that the second CC comprises the special subframe, and transmit the message or the SRS, or both, based on the determination that the message overlaps in time with the SRS and the determination that the first CP has the different duration than the second CP.

In some cases, the message (e.g., an uplink message) may be transmitted on the first CC and the SRS may be transmitted on the second CC. In some cases, the SRS is not transmitted based on the determination that the message overlaps in time with the SRS and the determination that the first CP has the different duration than the second CP. In some cases, the SRS is not transmitted based on the determination that the message overlaps in time with the SRS and the determination that the second CC comprises the special subframe. In these cases the transmitting comprises transmitting the message on the first CC.

The transmitter 935 may transmit signals received from other components of wireless device 900. In some examples, the transmitter 935 may be collocated with a receiver in a transceiver module. For example, the transmitter 935 may be an example of aspects of the transceiver 1125 described with reference to FIG. 11. The transmitter 935 may utilize a single antenna, or it may utilize a plurality of antennas.

Figure 10:
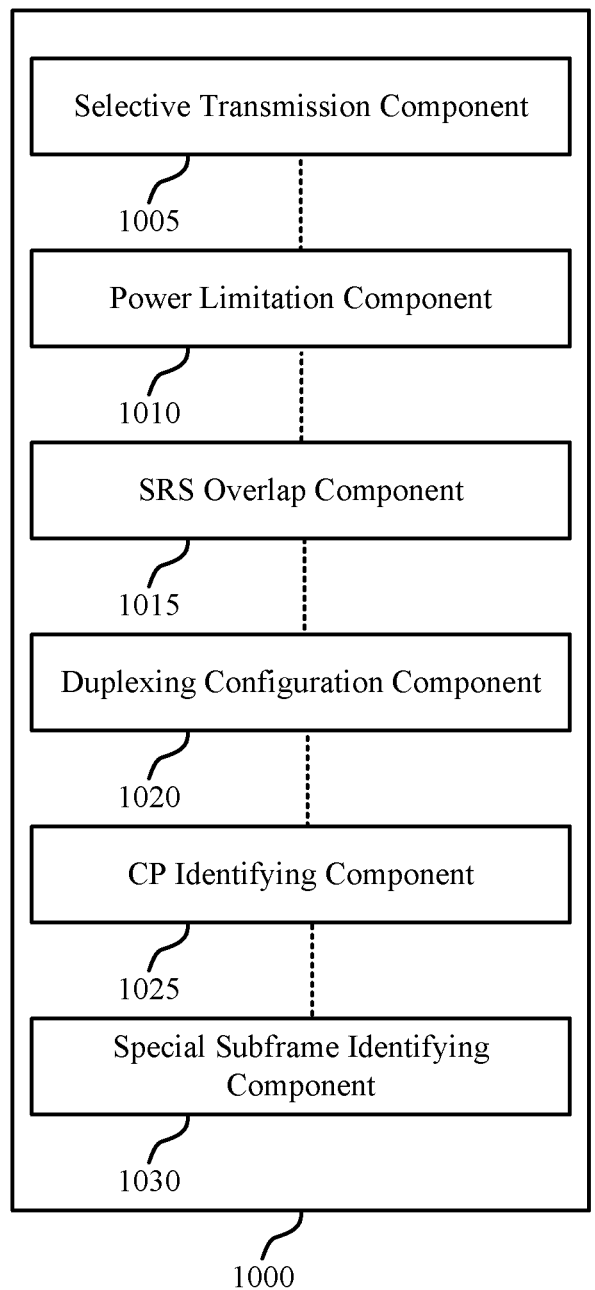

FIG. 10 shows a block diagram of a SRS transmission manager 1000 which may be an example of the corresponding component of wireless device 800 or wireless device 900. That is, SRS transmission manager 1000 may be an example of aspects of SRS transmission manager 810 or SRS transmission manager 910 described with reference to FIGS. 8 and 9. The SRS transmission manager 1000 may also be an example of aspects of the SRS transmission manager 1105 described with reference to FIG. 11.

The SRS transmission manager 1000 may include selective transmission component 1005, power limitation component 1010, SRS overlap component 1015, duplexing configuration component 1020, CP identifying component 1025 and special subframe identifying component 1030. Each of these modules may communicate, directly or indirectly, with one another (e.g., via one or more buses).

The selective transmission component 1005 may transmit the message or the SRS, or both, based on the determination that the message overlaps in time with the SRS and the determination that the second CC comprises the special subframe, and transmit the message or the SRS, or both, based on the determination that the message overlaps in time with the SRS and the determination that the first CP has the different duration than the second CP. The power limitation component 1010 may identify a power limitation of a UE, and the selective transmission component 1005 may cause a device (e.g., device 900) to transmit the message or SRS, or both, based on the power limitation.

The SRS overlap component 1015 may determine that a message scheduled for transmission on the first CC overlaps in time with a SRS scheduled for transmission on the second CC during the special subframe, and determine that a message scheduled for transmission on the first CC overlaps in time with a SRS scheduled for transmission on the second CC. In some cases, the message comprises a PUSCH message or a PUCCH message. In some cases, the message comprises acknowledgement/negative acknowledgment (ACK/NACK) feedback.

The duplexing configuration component 1020 may identify a duplexing configuration for the first CC or the second CC, where the transmitting is based on the duplexing configuration. The CP identifying component 1025 may determine whether a first CP for the first CC has a different duration than a second CP for the second CC. In some cases, the first CC and the second CC comprise CCs of a same TAG.

The special subframe identifying component 1030 may determine that the second CC comprises a special subframe that includes a set of UL symbols and a set of DL symbols. In some cases, the special subframe comprises a UL pilot time slot (UpPTS) configuration that comprises at least six UL symbols.

Figure 11:
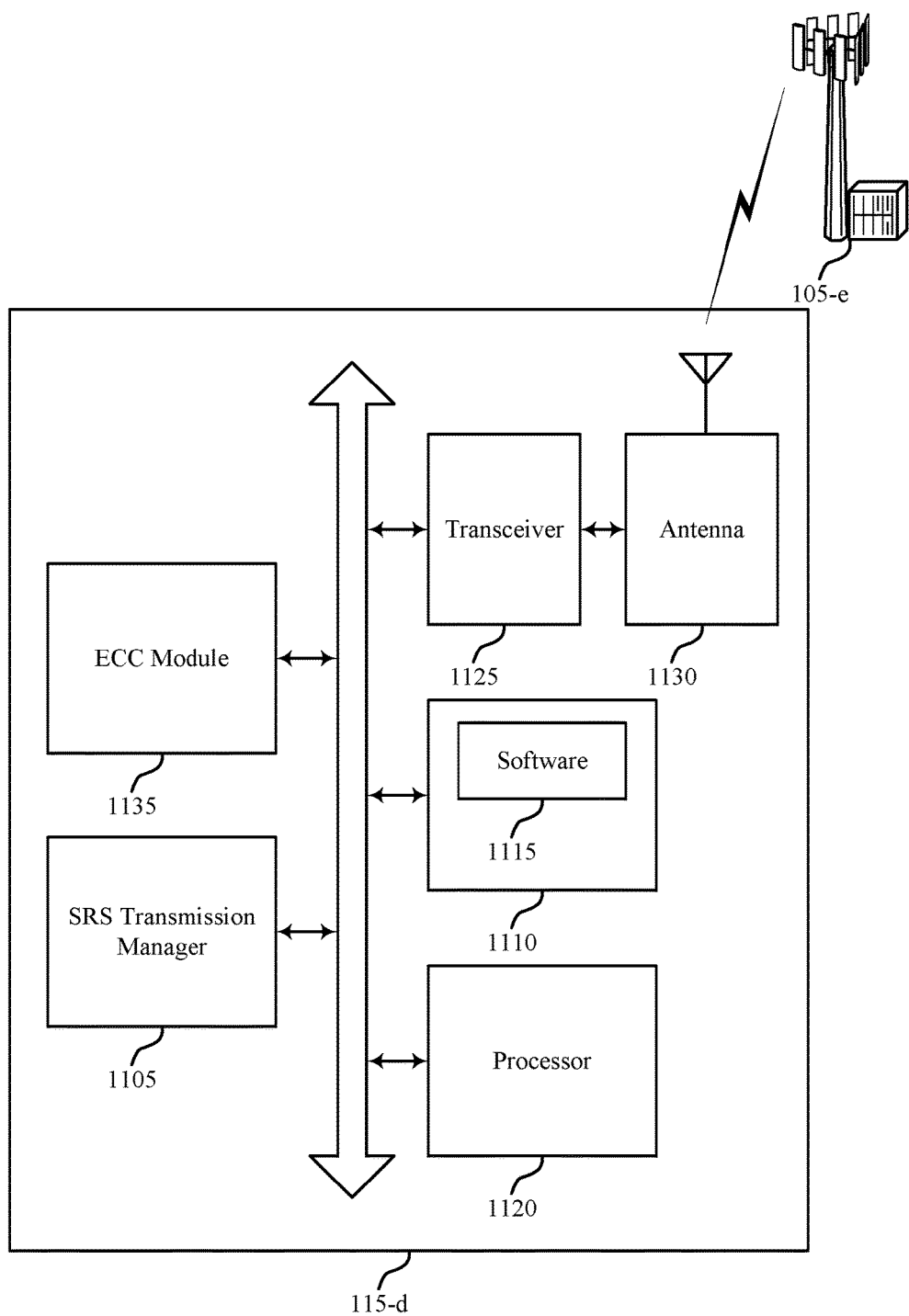
FIG. 11 illustrates a block diagram of a system including a user equipment (UE) that supports SRS transmission management in carrier aggregation in accordance with aspects of the present disclosure.

FIG. 11 shows a diagram of a system 1100 including a device that supports SRS transmission management in carrier aggregation in accordance with various aspects of the present disclosure. For example, system 1100 may include UE 115-d, which may be an example of a wireless device 800, a wireless device 900, or a UE 115 as described with reference to FIGS. 1, 2 and 8 through 10.

UE 115-d may also include SRS transmission manager 1105, memory 1110, processor 1120, transceiver 1125, and antenna 1130, and ECC module 1135. Each of these modules may communicate, directly or indirectly, with one another (e.g., via one or more buses). The SRS transmission manager 1105 may be an example of a SRS transmission manager as described with reference to FIGS. 8 through 10.

The memory 1110 may include random access memory (RAM) and read only memory (ROM). The memory 1110 may store computer-readable, computer-executable software including instructions that, when executed, cause the processor to perform various functions described herein (e.g., SRS transmission management in carrier aggregation, etc.). In some cases, the software 1115 may not be directly executable by the processor but may cause a computer (e.g., when compiled and executed) to perform functions described herein. The processor 1120 may include an intelligent hardware device, (e.g., a central processing unit (CPU), a microcontroller, an application specific integrated circuit (ASIC), etc.)

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

The ECC module 1135 may enable operations using eCCs such as communication using shared or unlicensed spectrum, using reduced TTIs or subframe durations, or using a large number of CCs.

Figure 12:
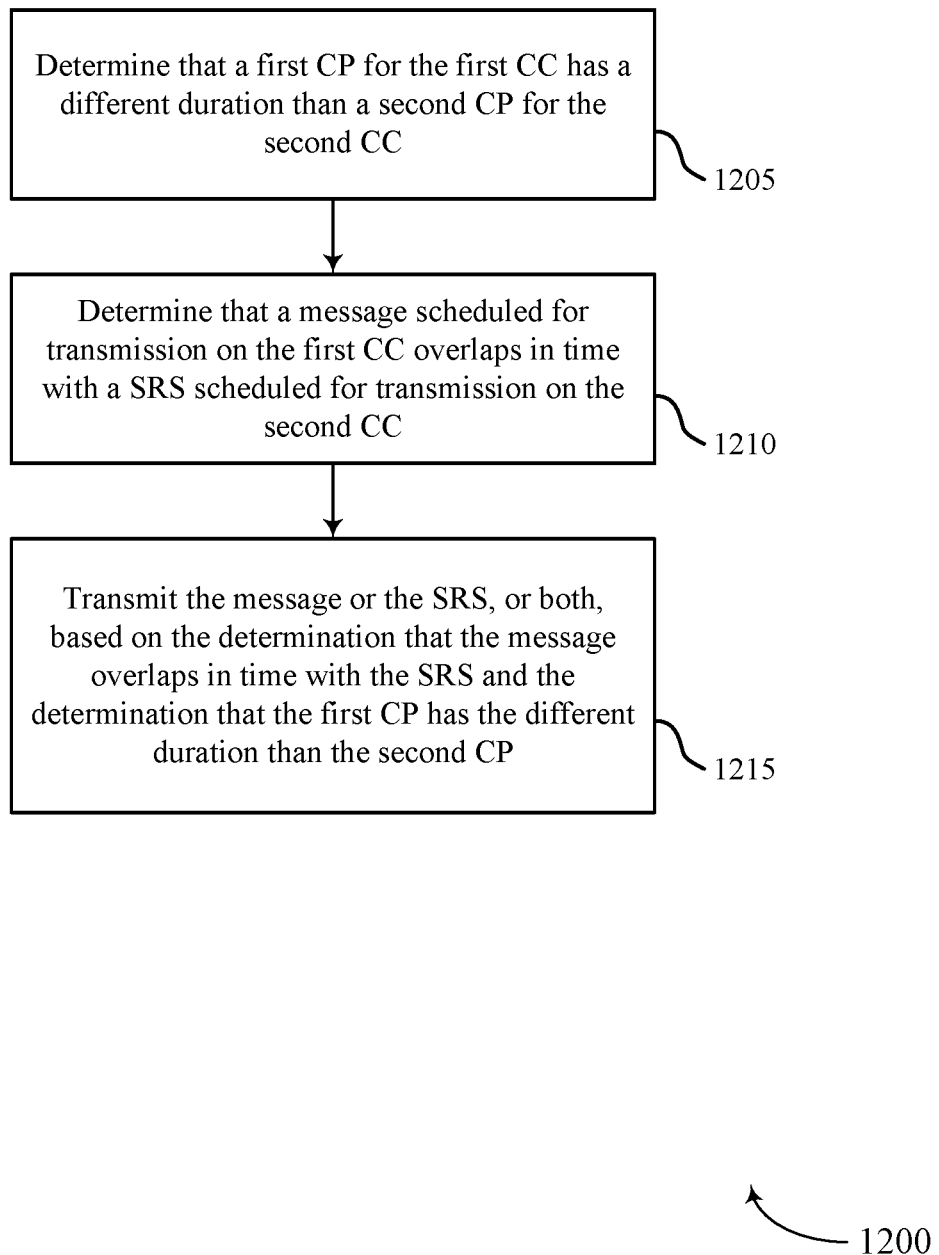
FIGS. 12 through 16 illustrate methods for SRS transmission management in carrier aggregation in accordance with aspects of the present disclosure.

FIG. 12 shows a flowchart illustrating a method 1200 for SRS transmission management in carrier aggregation in accordance with various aspects of the present disclosure. The operations of method 1200 may be implemented by a device such as a UE 115 or its components as described with reference to FIGS. 1 and 2. For example, the operations of method 1200 may be performed by the SRS transmission manager as described herein. In some examples, the UE 115 may execute a set of codes to control the functional elements of the device to perform the functions described below. Additionally or alternatively, the UE 115 may perform aspects the functions described below using special-purpose hardware.

At block 1205, the UE 115 may determine whether a first CP for the first CC has a different duration than a second CP for the second CC as described above with reference to FIGS. 2 through 7. In certain examples, the operations of block 1205 may be performed by the CP identifying component as described with reference to FIGS. 9 and 10.

At block 1210, the UE 115 may determine that a message scheduled for transmission on the first CC overlaps in time with a SRS scheduled for transmission on the second CC as described above with reference to FIGS. 2 through 7. In certain examples, the operations of block 1210 may be performed by the SRS overlap component as described with reference to FIGS. 9 and 10.

At block 1215, the UE 115 may transmit the message or the SRS, or both, based on the determination that the message overlaps in time with the SRS and the determination whether the first CP has the different duration than the second CP as described above with reference to FIGS. 2 through 7. In certain examples, the operations of block 1215 may be performed by the selective transmission component as described with reference to FIGS. 9 and 10.

Figure 13:
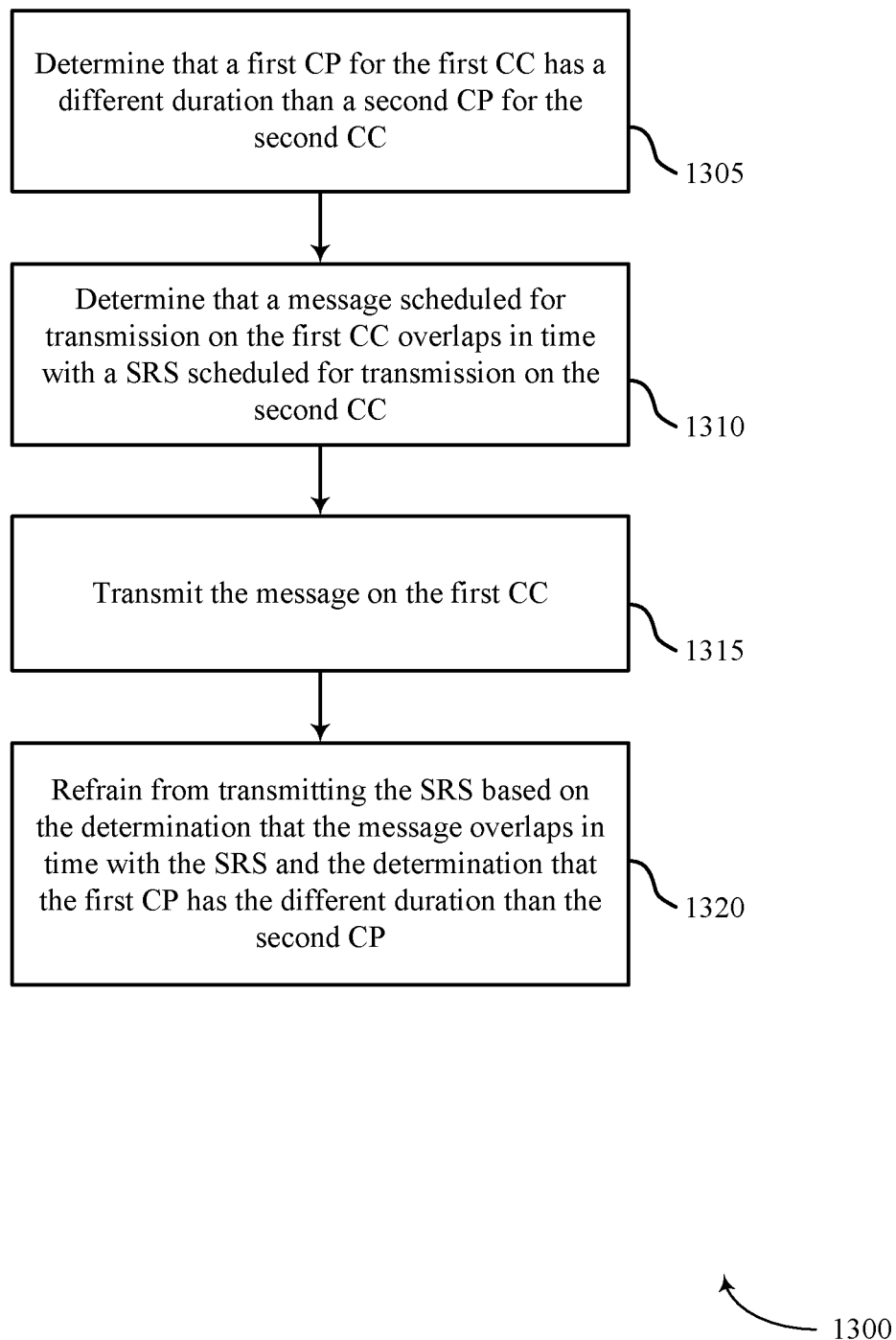

FIG. 13 shows a flowchart illustrating a method 1300 for SRS transmission management in carrier aggregation in accordance with various aspects of the present disclosure. The operations of method 1300 may be implemented by a device such as a UE 115 or its components as described with reference to FIGS. 1 and 2. For example, the operations of method 1300 may be performed by the SRS transmission manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may determine whether a first CP for the first CC has a different duration than a second CP for the second CC as described above with reference to FIGS. 2 through 7. In certain examples, the operations of block 1305 may be performed by the CP identifying component as described with reference to FIGS. 9 and 10.

At block 1310, the UE 115 may determine that a message scheduled for transmission on the first CC overlaps in time with a SRS scheduled for transmission on the second CC as described above with reference to FIGS. 2 through 7. In certain examples, the operations of block 1310 may be performed by the SRS overlap component as described with reference to FIGS. 9 and 10.

At block 1315, the UE 115 may transmit the message or the SRS, or both, based on the determination that the message overlaps in time with the SRS and the determination that the first CP has the different duration than the second CP as described above with reference to FIGS. 2 through 7. In certain examples, the operations of block 1320 may be performed by the selective transmission component as described with reference to FIGS. 9 and 10.

At block 1320, the UE 115 may refrain from transmitting the SRS based on the determination that the message overlaps in time with the SRS and the determination that the first CP has the different duration than the second CP, where the transmitting comprises: transmitting the message on the first CC as described above with reference to FIGS. 2 through 7. In certain examples, the operations of block 1325 may be performed by the selective transmission component as described with reference to FIGS. 9 and 10.

Figure 14:
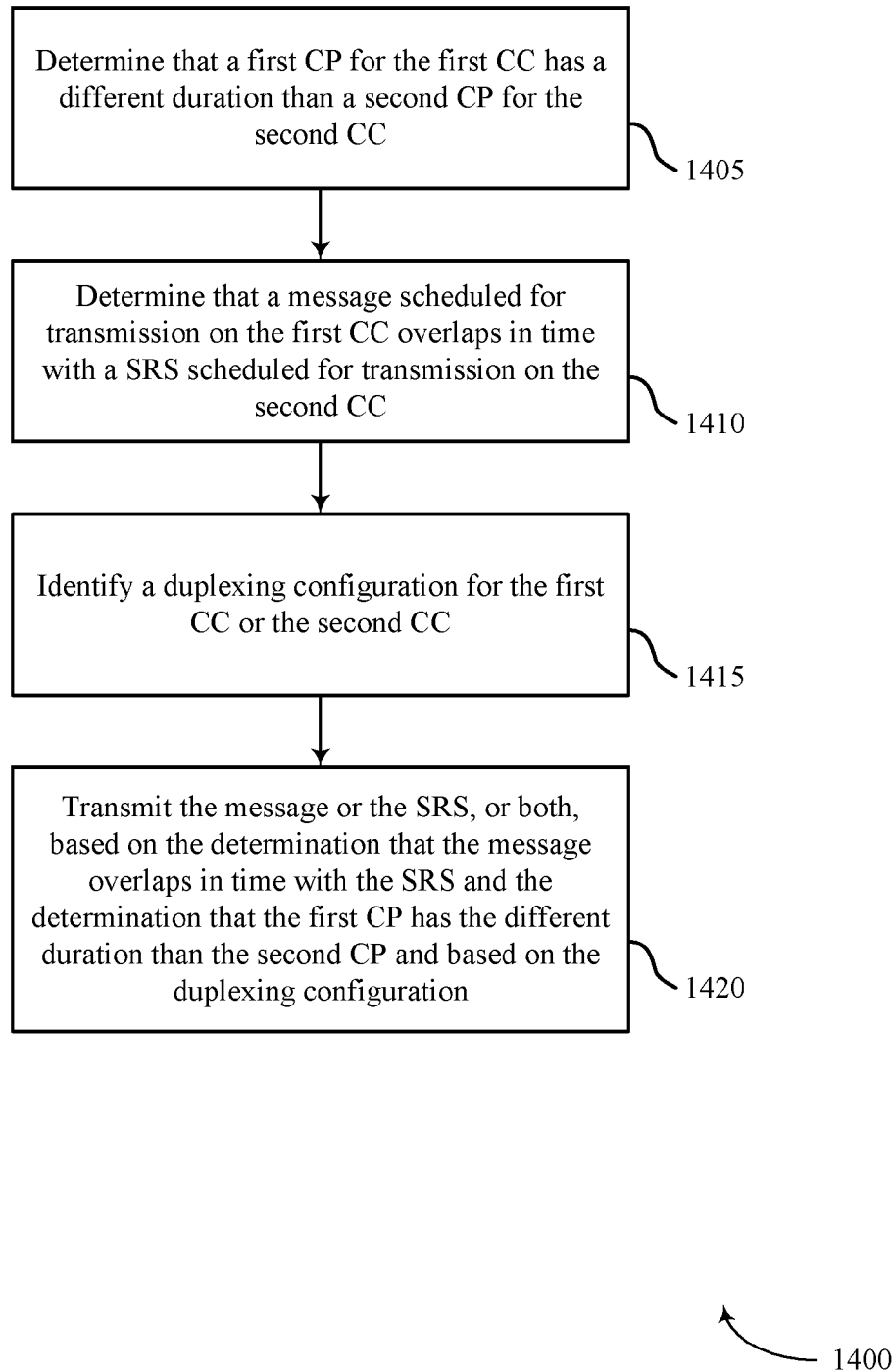

FIG. 14 shows a flowchart illustrating a method 1400 for SRS transmission management in carrier aggregation in accordance with various aspects of the present disclosure. The operations of method 1400 may be implemented by a device such as a UE 115 or its components as described with reference to FIGS. 1 and 2. For example, the operations of method 1400 may be performed by the SRS transmission manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may determine that a first CP for the first CC has a different duration than a second CP for the second CC as described above with reference to FIGS. 2 through 7. In certain examples, the operations of block 1405 may be performed by the CP identifying component as described with reference to FIGS. 9 and 10.

At block 1410, the UE 115 may determine that a message scheduled for transmission on the first CC overlaps in time with a SRS scheduled for transmission on the second CC as described above with reference to FIGS. 2 through 7. In certain examples, the operations of block 1410 may be performed by the SRS overlap component as described with reference to FIGS. 9 and 10.

At block 1415, the UE 115 may identify a duplexing configuration for the first CC or the second CC, where the transmitting is based on the duplexing configuration as described above with reference to FIGS. 2 through 7. In certain examples, the operations of block 1415 may be performed by the duplexing configuration component as described with reference to FIGS. 9 and 10.

At block 1420, the UE 115 may transmit the message or the SRS, or both, based on the determination that the message overlaps in time with the SRS and the determination that the first CP has the different duration than the second CP as described above with reference to FIGS. 2 through 7. In certain examples, the operations of block 1420 may be performed by the selective transmission component as described with reference to FIGS. 9 and 10.

Figure 15:
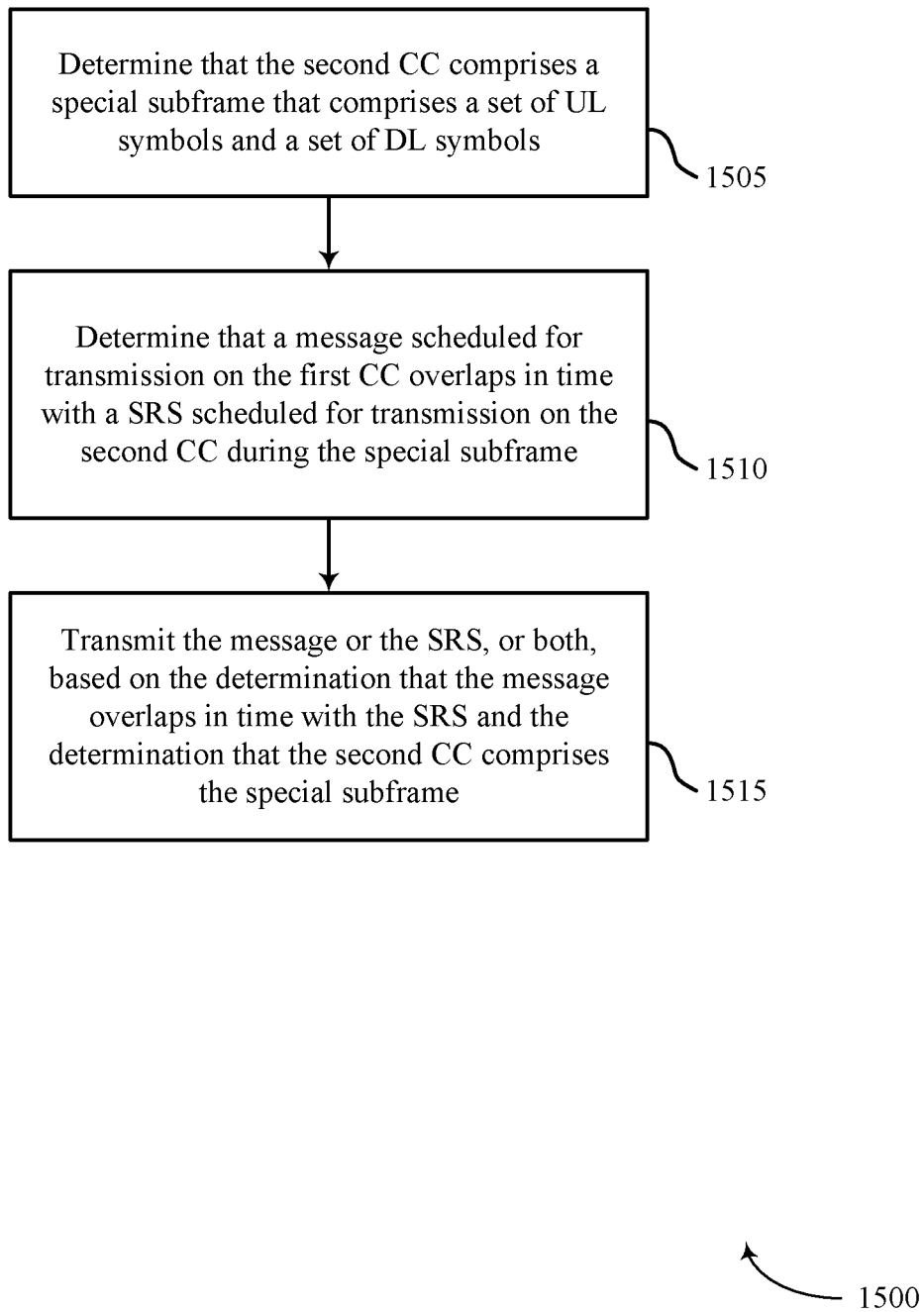

FIG. 15 shows a flowchart illustrating a method 1500 for SRS transmission management in carrier aggregation in accordance with various aspects of the present disclosure. The operations of method 1500 may be implemented by a device such as a UE 115 or its components as described with reference to FIGS. 1 and 2. For example, the operations of method 1500 may be performed by the SRS transmission manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may determine that the second CC comprises a special subframe that includes a set of UL symbols and a set of DL symbols as described above with reference to FIGS. 2 through 7. In certain examples, the operations of block 1505 may be performed by the special subframe identifying component as described with reference to FIGS. 9 and 10.

At block 1510, the UE 115 may determine that a message scheduled for transmission on the first CC overlaps in time with a SRS scheduled for transmission on the second CC during the special subframe as described above with reference to FIGS. 2 through 7. In certain examples, the operations of block 1510 may be performed by the SRS overlap component as described with reference to FIGS. 9 and 10.

At block 1515, the UE 115 may transmit the message or the SRS, or both, based on the determination that the message overlaps in time with the SRS and the determination that the second CC comprises the special subframe as described above with reference to FIGS. 2 through 7. In certain examples, the operations of block 1515 may be performed by the selective transmission component as described with reference to FIGS. 9 and 10.

Figure 16:
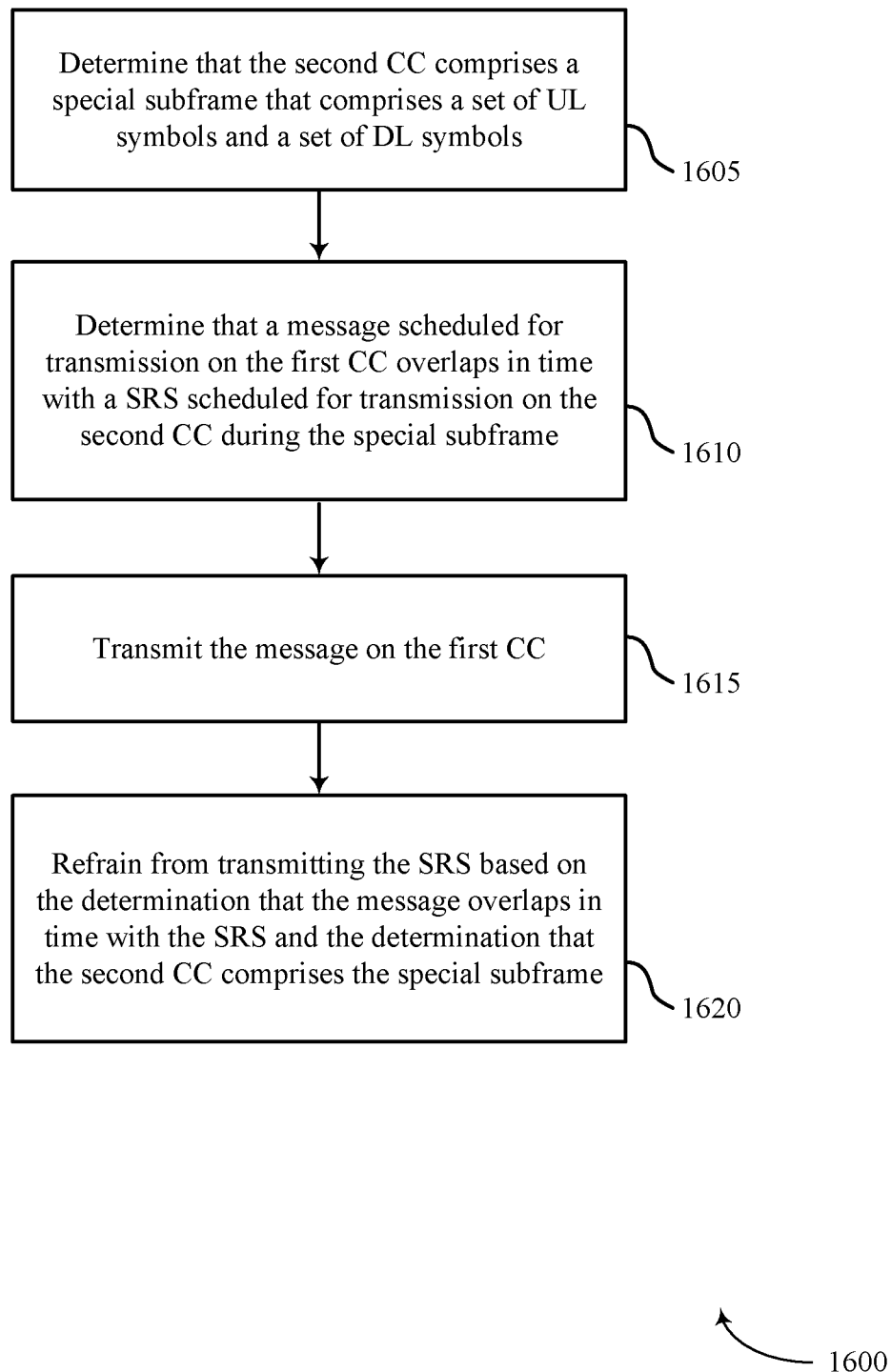

FIG. 16 shows a flowchart illustrating a method 1600 for SRS transmission management in carrier aggregation in accordance with various aspects of the present disclosure. The operations of method 1600 may be implemented by a device such as a UE 115 or its components as described with reference to FIGS. 1 and 2. For example, the operations of method 1600 may be performed by the SRS transmission manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may determine that the second CC comprises a special subframe that includes a set of UL symbols and a set of DL symbols as described above with reference to FIGS. 2 through 7. In certain examples, the operations of block 1605 may be performed by the special subframe identifying component as described with reference to FIGS. 9 and 10.

At block 1610, the UE 115 may determine that a message scheduled for transmission on the first CC overlaps in time with a SRS scheduled for transmission on the second CC during the special subframe as described above with reference to FIGS. 2 through 7. In certain examples, the operations of block 1610 may be performed by the SRS overlap component as described with reference to FIGS. 9 and 10.

At block 1615, the UE 115 may transmit the message or the SRS, or both, based on the determination that the message overlaps in time with the SRS and the determination that the second CC comprises the special subframe as described above with reference to FIGS. 2 through 7. In certain examples, the operations of block 1620 may be performed by the selective transmission component as described with reference to FIGS. 9 and 10.

At block 1620, the UE 115 may refrain from transmitting the SRS based on the determination that the message overlaps in time with the SRS and the determination that the second CC comprises the special subframe, and where the transmitting comprises: transmitting the message on the first CC as described above with reference to FIGS. 2 through 7. In certain examples, the operations of block 1625 may be performed by the selective transmission component as described with reference to FIGS. 9 and 10.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for SRS transmission management in carrier aggregation.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for SRS transmission management in carrier aggregation. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication performed by a user equipment (UE) having a carrier aggregation (CA) configuration with a first component carrier (CC) and a second CC in a same timing adjustment group (TAG), comprising:
    determining that a first cyclic prefix (CP) for the first CC has a same duration as a second CP for the second CC;
    determining that a message scheduled for transmission on the first CC overlaps in time with a sounding reference signal (SRS) scheduled for transmission on the second CC;
    refraining from transmitting the SRS based at least in part on the determination that the message overlaps in time with the SRS and the determination that the first CP has the same duration as the second CP; and
    transmitting the message on the first CC.

2. The method of claim 1, further comprising:
    identifying a power limitation of a user equipment (UE), wherein the transmitting is based at least in part on the power limitation.

3. The method of claim 1, wherein the message comprises a physical uplink shared channel (PUSCH) message or a physical uplink control channel (PUCCH) message.

4. The method of claim 3, wherein the message comprises acknowledgement/negative acknowledgment (ACK/NACK) feedback.

5. The method of claim 1, further comprising:
    identifying a duplexing configuration for the first CC or the second CC, wherein the transmitting is based at least in part on the duplexing configuration.

6. The method of claim 1, wherein determining that the message scheduled for transmission on the first CC overlaps in time with the SRS scheduled for transmission on the second CC is based at least in part on a number of SRS symbols.

7. A method of wireless communication performed by a user equipment (UE) having a carrier aggregation (CA) configuration with a first component carrier (CC) and a second CC in a same timing adjustment group (TAG), comprising:
    determining that the second CC includes a sounding reference signal (SRS) scheduled for transmission on the second CC during a special subframe that comprises a plurality of uplink (UL) symbols and a plurality of downlink (DL) symbols, wherein the special subframe comprises a UL pilot time slot (UpPTS) configuration that comprises at least six UL symbols;
    determining that a message scheduled for transmission on the first CC overlaps in time with the SRS scheduled for transmission on the second CC during the special subframe; and
    transmitting the message or the SRS, or both, based at least in part on the determination that the message overlaps in time with the SRS and the determination that the SRS on the second CC comprises the special subframe.

8. The method of claim 7, wherein the transmitting comprises:
    transmitting the message on the first CC and transmitting the SRS on the second CC.

9. The method of claim 7, further comprising:
    refraining from transmitting the SRS based at least in part on the determination that the message overlaps in time with the SRS and the determination that the second CC comprises the special subframe, and wherein the transmitting comprises:
    transmitting the message on the first CC.

10. The method of claim 7, further comprising:
    identifying a power limitation for a UE, wherein transmitting the message or the SRS, or both, is based at least in part on the power limitation.

11. The method of claim 7, wherein the message comprises a PUSCH message or a PUCCH message.

12. The method of claim 11, wherein the message comprises acknowledgement/negative acknowledgment (ACK/NACK) feedback.

13. The method of claim 7, further comprising:
    identifying a duplexing configuration for the first CC or the second CC, wherein performing the transmitting is based at least in part on the duplexing configuration.

14. An apparatus for wireless communication comprising:
    a processor;
    memory in electronic communication with the processor; and
    instructions stored in the memory and operable, when executed by the processor in a carrier aggregation (CA) configuration having a first component carrier (CC) and a second CC of a same timing adjustment group (TAG), cause the apparatus to:
    determine that a first cyclic prefix (CP) for the first CC has a same duration as a second CP for the second CC;
    determine that a message scheduled for transmission on the first CC overlaps in time with a sounding reference signal (SRS) scheduled for transmission on the second CC;
    refrain from transmitting the SRS based at least in part on the determination that the message overlaps in time with the SRS and the determination that the first CP has the same duration as the second CP; and
    transmit the message on the first CC.

15. The apparatus of claim 14, wherein the instructions are operable to cause the apparatus to:
    identify a power limitation of a user equipment (UE); and
    transmit the message based at least in part on the power limitation.

16. The apparatus of claim 14, wherein the message comprises a physical uplink shared channel (PUSCH) message or a physical uplink control channel (PUCCH) message.

17. The apparatus of claim 16, wherein the message comprises acknowledgement/negative acknowledgment (ACK/NACK) feedback.

18. The apparatus of claim 14, wherein the instructions are operable to cause the apparatus to:
identify a duplexing configuration for the first CC or the second CC; and
transmit the message based at least in part on the duplexing configuration.

19. The apparatus of claim 14, wherein determining that the message scheduled for transmission on the first CC overlaps in time with the SRS scheduled for transmission on the second CC is based at least in part on a number of SRS symbols.

20. An apparatus for wireless communication comprising:
a processor;
memory in electronic communication with the processor; and
instructions stored in the memory and operable, when executed by the processor in a carrier aggregation (CA) configuration having a first component carrier (CC) and a second CC of a same timing adjustment group (TAG), cause the apparatus to:
determine that the second CC includes a sounding reference signal (SRS) scheduled for transmission on the second CC during a special subframe that comprises a plurality of uplink (UL) symbols and a plurality of downlink (DL) symbols, wherein the special subframe comprises a UL pilot time slot (UpPTS) configuration that comprises at least six UL symbols;
determine that a message scheduled for transmission on the first CC overlaps in time with the SRS scheduled for transmission on the second CC during the special subframe; and
transmit the message or the SRS, or both, based at least in part on the determination that the message overlaps in time with the SRS and the determination that the SRS on the second CC comprises the special subframe.

21. The apparatus of claim 20, wherein the instructions are operable to cause the apparatus to:
transmit the message on the first CC; and
transmit the SRS on the second CC.

22. The apparatus of claim 20, wherein the instructions are operable to cause the apparatus to:
refrain from transmitting the SRS based at least in part on the determination that the message overlaps in time with the SRS and the determination that the second CC comprises the special subframe.

23. The apparatus of claim 20, wherein the instructions operable to cause the apparatus to:
identify a power limitation for a UE; and
transmitting the message or the SRS, or both, based at least in part on the power limitation.

24. The apparatus of claim 20, wherein the message comprises a PUSCH message or a PUCCH message.

25. The apparatus of claim 24, wherein the message comprises acknowledgement/negative acknowledgment (ACK/NACK) feedback.

26. The apparatus of claim 20, wherein the instructions are operable to cause the apparatus to:
identify a duplexing configuration for the first CC or the second CC; and
transmit the message or the SRS, or both, based at least in part on the duplexing configuration.

* * * * *